(12) United States Patent
Kim et al.

(10) Patent No.: US 9,860,621 B2
(45) Date of Patent: Jan. 2, 2018

(54) HOME APPLIANCE AND OPERATING METHOD THEREOF

(71) Applicant: LG ELECTRONICS INC., Seoul (KR)

(72) Inventors: Sangoh Kim, Seoul (KR); Dullae Min, Seoul (KR); Junsang Yun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 245 days.

(21) Appl. No.: 14/536,109

(22) Filed: Nov. 7, 2014

(65) Prior Publication Data

US 2015/0131810 A1 May 14, 2015

(30) Foreign Application Priority Data

Nov. 8, 2013 (KR) .................. 10-2013-0135651
Nov. 8, 2013 (KR) .................. 10-2013-0135653

(51) Int. Cl.
*H04B 3/00* (2006.01)
*H04R 1/02* (2006.01)
*H04L 12/28* (2006.01)

(52) U.S. Cl.
CPC ......... *H04R 1/028* (2013.01); *H04L 12/2834* (2013.01); *H04L 2012/285* (2013.01); *H04L 2012/2841* (2013.01); *H04R 2420/07* (2013.01)

(58) Field of Classification Search
CPC ............ H04R 2420/07; H04R 1/028; H04L 2012/2841; H04L 12/2834; H04L 2012/285
USPC ............................................. 381/77
See application file for complete search history.

(56) References Cited

U.S. PATENT DOCUMENTS

2013/0054758 A1* 2/2013 Imes .................. H04L 12/2827
                                                            709/219

FOREIGN PATENT DOCUMENTS

| CN | 1987252 A | 6/2007 |
|---|---|---|
| CN | 101207412 A | 6/2008 |
| CN | 203206446 U | 9/2013 |

* cited by examiner

*Primary Examiner* — Paul S Kim
(74) *Attorney, Agent, or Firm* — Dentons US LLP

(57) ABSTRACT

A home appliance and an operating method thereof are disclosed. The appliance includes an audio output unit, a communication unit to perform pairing with a mobile terminal and to receive audio data and information data from the mobile terminal after the pairing is completed, and a controller to perform control to output the received audio data through the audio output unit. Accordingly, audio data received from a mobile terminal is output.

15 Claims, 35 Drawing Sheets

200a

200b

200c

HOME APPLIANCE AND OPERATING METHOD THEREOF

CROSS-REFERENCE TO RELATED APPLICATION

This application claims the priority benefit of Korean Patent Application Nos. 10-2013-0135651 and 10-2013-0135653, filed on Nov. 8, 2013 in the Korean Intellectual Property Office, the disclosure of which is incorporated herein by reference.

BACKGROUND OF THE INVENTION

Field of the Invention

The present invention relates to a home appliance and an operating method thereof, and more particularly to a home appliance and an operating method thereof for outputting audio data received from a mobile terminal.

Description of the Related Art

Among home appliances positioned in a building, a fridge stores food, a washing machine processes laundry, an air conditioner adjusts indoor temperature, and a kitchen utensil cooks, for users.

As various communication schemes have been developed, research has been conducted into various methods for improving user convenience via communication with respect to home appliance.

SUMMARY OF THE INVENTION

Therefore, the present invention has been made in view of the above problems, and it is an object of the present invention to provide a home appliance and an operating method thereof, for outputting audio data received from a mobile terminal.

In accordance with an aspect of the present invention, the above and other objects can be accomplished by the provision of a home appliance including an audio output unit, a communication unit to perform pairing with a mobile terminal and to receive audio data and information data from the mobile terminal after the pairing is completed, and a controller to perform control to output the received audio data through the audio output unit.

In accordance with another aspect of the present invention, there is provided a home appliance including a communication unit to perform pairing with a mobile terminal and to receive external environment data from the mobile terminal after the pairing is completed, and a controller to perform control to calculate related information based on the received external environment data and to output the calculated related information.

In accordance with a further aspect of the present invention, there is provided an operating method of a home appliance, the operating method including performing pairing with a mobile terminal, receiving audio data and information data from the mobile terminal after the pairing is completed, and outputting the received audio data through an audio output unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

In addition, the suffixes "module" and "unit" of elements herein are used for convenience of description and do not have any distinguishable meanings or functions. Thus the suffixes "module" and "unit" can be used interchangeably.

Figure 1:
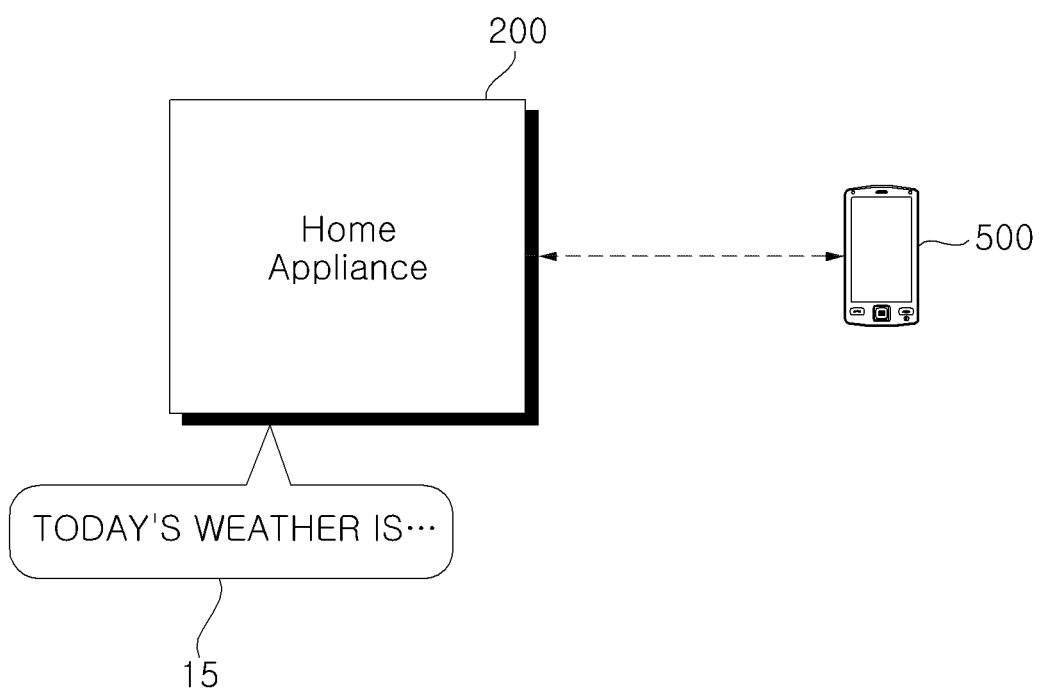
FIG. 1 is a diagram of a structure of a home appliance and a mobile terminal according to an embodiment of the present invention.

FIG. 1 is a diagram of a structure of a home appliance 200 and a mobile terminal 500 according to an embodiment of the present invention.

Referring to FIG. 1, the home appliance 200 according to an embodiment of the present invention may wirelessly communicate with the mobile terminal 500.

In particular, after being paired with the mobile terminal 500, the home appliance 200 may receive signal-processed audio data and information data from the mobile terminal 500.

In addition, the home appliance 200 may output the received data through an audio output unit without changes.

Although FIG. 1 illustrates weather related audio data such as "Today's weather is , , ," 15, various examples are possible. For example, the home appliance 200 may receive content data such as music and moving picture and reproduce the received content data. In addition, the home appliance 200 may output audio of the reproduced content data through the audio output unit without changes.

In addition, when the mobile terminal 500 receives call or a message, the home appliance 200 may receive audio data associated with telephone call corresponding to the call or audio data associated with the message and output the audio data through the audio output unit without changes.

The home appliance may receive user voice by. That is, voice input may be received through an audio input unit and the received audio data may be transmitted to the mobile terminal 500.

The home appliance 200 and the mobile terminal 500 communicate with each other via a wireless data communication method for transmitting audio data and information data, for example, Bluetooth. Other various communication methods may also be used.

According to embodiments of the present invention, the home appliance 200 may not process voice recognition, but instead the mobile terminal 500 or a server (not shown) connected to the mobile terminal 500 may perform voice recognition and signal processes FIGS. 2A to 2E are diagrams illustrating various examples of a home appliance.

Figure 2A:
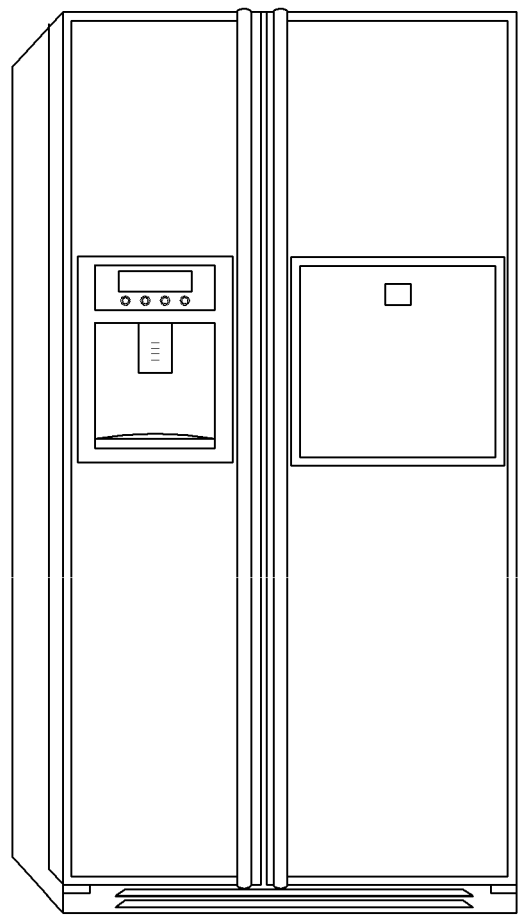
FIGS. 2A to 2E are diagrams illustrating various examples of a home appliance.
Figure 2B:
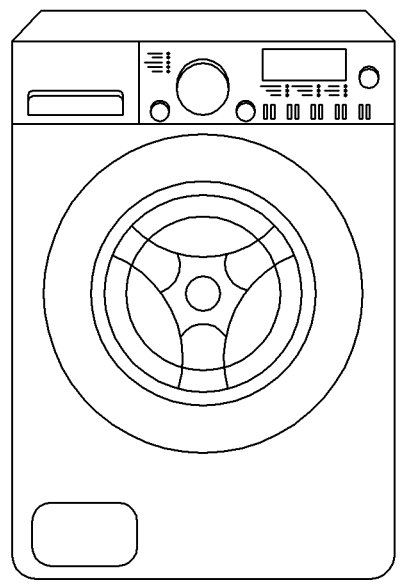
Figure 2C:
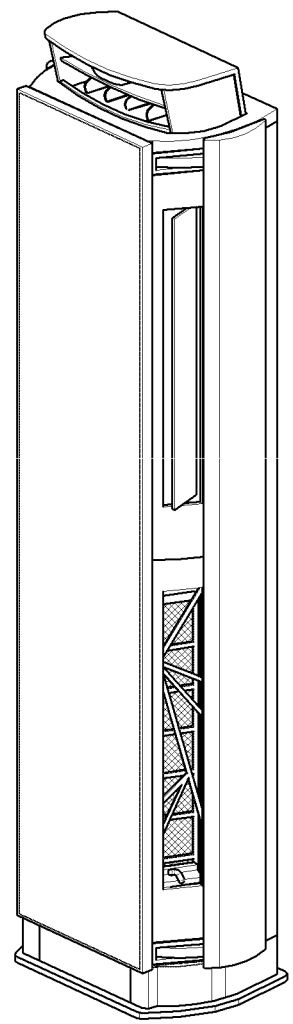
Figure 2D:
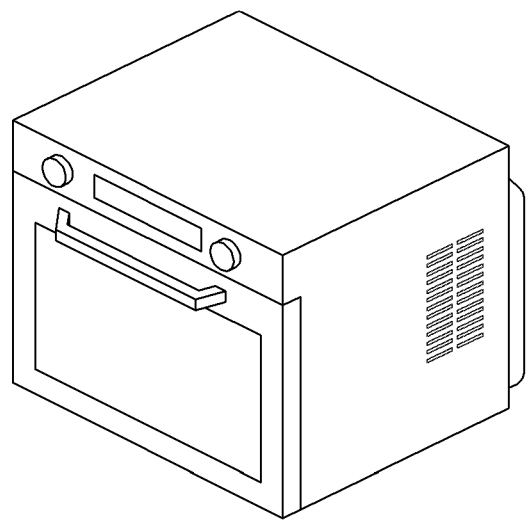
Figure 2E:
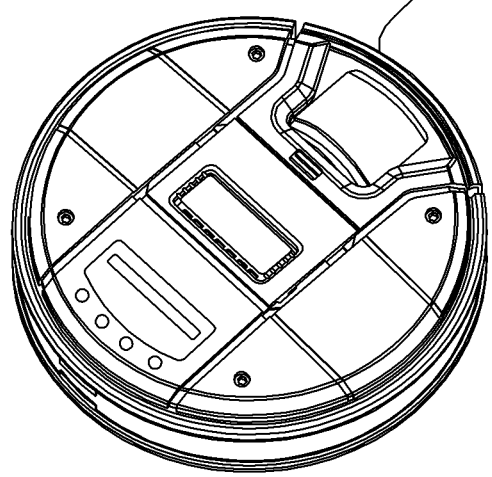

FIG. 2A illustrates a fridge 200a, FIG. 2B illustrates a washing machine 200b, FIG. 2C illustrates an air conditioner 200c, FIG. 2D illustrates a kitchen utensil 200d, and FIG. 2E illustrates a cleaner 200e. There may be various examples of the home appliance.

Figure 3:
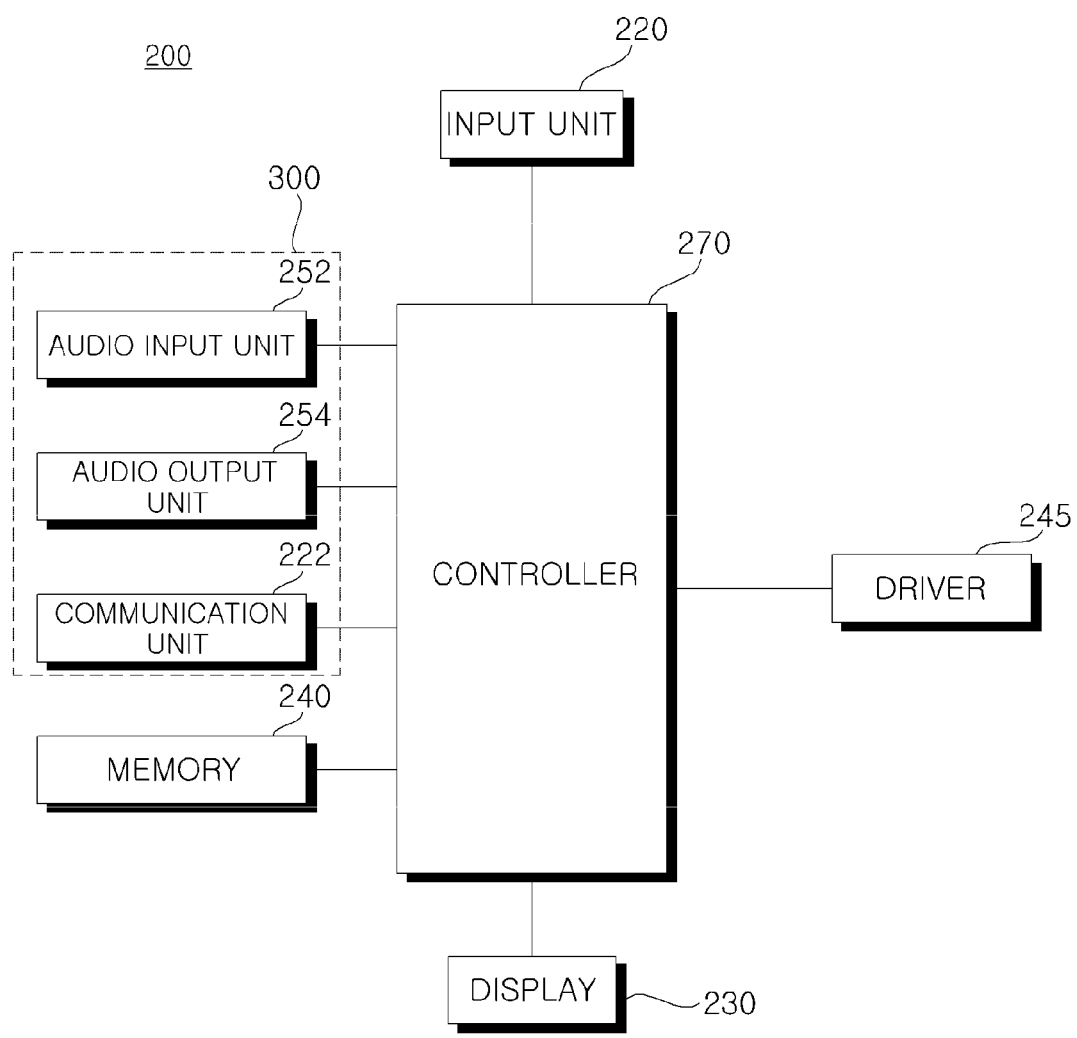
FIG. 3 is a block diagram of an internal structure of the home appliance of FIG. 1.

FIG. 3 is a block diagram of an internal structure of the home appliance 200 of FIG. 1.

Referring to FIG. 3, the home appliance 200 may include an input unit 220 for user input, a display 230 for displaying an operation state, etc. of the home appliance 200, a communication unit 222 for communication with other external devices, a driver 245 for driving the home appliance 200, a controller 270 for internal control, a memory 240, an audio input unit 252, and an audio output unit 254.

The input unit 220 may include a local key for user input.

The driver 245 may include a corresponding driver according to type of the home appliance 200.

For example, when the home appliance 200 is a fridge, the driver 245 may include a refrigerator driver for operating a refrigerator fan for supplying cooled air to a refrigerator, a freezer driver for operating a freezer fan for supplying cooled air to a freezer, and a compressor driver for operating a compressor for compressing a refrigerant.

As another example, when the home appliance 200 is a washing machine, the driver 245 may include a driver for driving a drum or a tub.

As another example, when the home appliance 200 is an air conditioner, the driver 245 may include a compressor driver for driving a compressor in an outdoor fan, an outdoor fan driver for operating an outdoor fan for heat exchange, and an interior fan driver for operating an interior fan for heat exchange.

As another example, when the home appliance 200 is a kitchen utensil, the driver 245 may include a microwave driver for outputting microwaves into a cavity.

As another example, when the home appliance 200 is a cleaner, the driver 245 may include a fan motor driver for intake air.

The communication unit 222 may wirelessly communicate with the mobile terminal 500. For example, the communication unit 222 may communicate via Bluetooth. The communication unit 222 may perform pairing with the mobile terminal 500 and after being paired with the mobile terminal 500, may receive audio data and information data from the mobile terminal 500.

The communication unit 222 may be included in the home appliance 200 and may be included in a single module 300 along with the audio output unit 254 and the audio input unit 252.

Thus by disposing the single module 300 in the home appliance 200, the communication unit 222 may simply receive audio data received from the mobile terminal 500 and may reproduce the audio data.

The memory 240 may store various data for an overall operation of the home appliance 200.

The audio input unit 252 may receive user voice. To this end, the audio input unit 252 may include a microphone. The received voice may be converted into a signal and transmitted to the controller 270.

The audio output unit 254 may output an audio signal received from the communication unit 222. To this end, the audio output unit 254 may include a speaker, etc.

The audio output unit 254 may convert an electrical signal from the controller 270 into an audio signal and output the audio signal. For example, the audio output unit 254 may output audio data indicating an operation state of the home appliance 200.

The controller 270 may control an overall operation of the home appliance 200. The controller 270 may control operations of the input unit 220, the display 230, the communication unit 222, the driver 245, the memory 240, the audio input unit 252, the audio output unit 254, etc.

With regard to embodiments of the present invention, the controller 270 may control the communication unit 222 to output audio data received through the communication unit 222, through the audio output unit 254.

Figure 4:
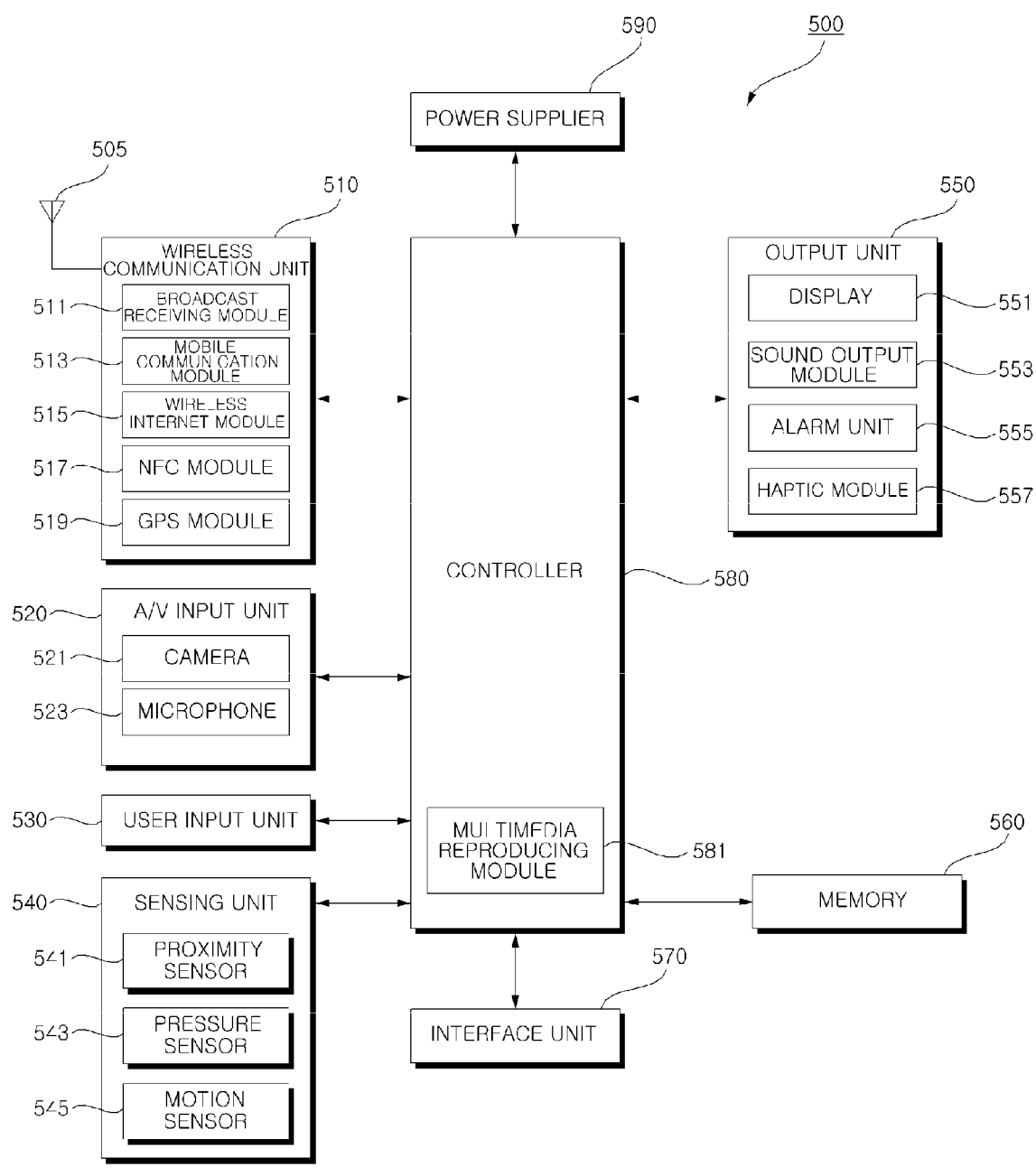
FIG. 4 is a block diagram of an internal structure of the mobile terminal of FIG. 1.

FIG. 4 is a block diagram of an internal structure of the mobile terminal 500 of FIG. 1.

Referring to FIG. 4, the mobile terminal 500 may include a wireless communication unit 510, an audio/video (A/V) input unit 520, a user input unit 530, a sensing unit 540, an output unit 550, a memory 560, an interface unit 570, a controller 580, and a power supplier 590.

The wireless communication unit 510 may include a broadcast receiving module 511, a mobile communication module 513, a wireless Internet module 515, a near field communication (NFC) module 517, and a global position system (GPS) module 519, etc.

The broadcast receiving module 511 may receive at least one of a broadcast signal and broadcast related information from an external broadcast managing server through a broadcast channel. In this case, the broadcast channel may include a satellite channel, a terrestrial channel, etc.

The broadcast signal and/or broadcast related information received through the broadcast receiving module 511 may be stored in the memory 560.

The mobile communication module 513 may transmit and receive radio signals to and from at least one of a base station, an external terminal, and a server in a mobile communication network. Here, the radio signal may include various types of data according to transmission and reception of a voice call signal, a video call signal, or a text/multimedia message.

The wireless Internet module 515 refers to a module for wireless Internet access and may be installed internally or externally on the mobile terminal 500. For example, the wireless Internet module 515 may perform WiFi-based wireless communication or WiFi Direct-based wireless communication.

The NFC module 517 may perform wireless communication. Upon moving the NFC module 517 closely to a home appliance including an NFC tag or an NFC module within a predetermined distance or less, that is, upon performing tagging, the NFC module 517 may receive data from a corresponding home appliance or transmit data to a corresponding home appliance.

In addition, as local area communication technology, Bluetooth, radio frequency identification (RFID), infrared data association (IrDA), ultra wideband (UWB), ZigBee, etc. may be used.

The GPS module 519 may receive positional information from a plurality of GPS artificial satellites.

The A/V input unit 520 may be used for audio signal or video signal input and may include a camera 521, a microphone 523, etc.

The user input unit 530 generates key input data that is input for control of an operation of a terminal by a user. To this end, the user input unit 530 may include a key pad, a dome switch, a touch pad (static pressure/electrostatic), etc. In particular, when the touch pad constitutes an inter-layered structure with a display 551, the inter-layered structure may be referred to as a touch screen.

The sensing unit 540 may detect a current state of the mobile terminal 500, such as an opening and closing state of the mobile terminal 500, a location of the mobile terminal 500, whether user contact is present, etc. and generate a sensing signal for controlling an operation of the mobile terminal 500.

The sensing unit 540 may include a proximity sensor 541, a pressure sensor 543, a motion sensor 545, etc. The motion sensor 545 may detect the movement, the location, etc. of the mobile terminal 500 using an acceleration sensor, a gyro sensor, a gravity sensor, etc. In particular, the gyro sensor may be a sensor for measuring an angular velocity and may detect an inclination direction (angle) based on a reference direction.

The output unit 550 may include, the display 551, a sound output module 553, an alarm unit 555, a haptic module 557, etc.

The display 551 displays and outputs information processed by the mobile terminal 500.

As described above, when the display 551 and a touch pad form an inter-layered structure to constitute a touch screen, the display 551 may also be used as an input device to which information is capable of being input by user touch as well as an output device.

The sound output module 553 outputs audio data that is received from the wireless communication unit 510 or stored in the memory 560. The sound output module 553 may include a speaker, a Buzzer, etc.

The alarm unit 555 outputs a signal indicating occurrence of an event of the mobile terminal 500. For example, the alarm unit 555 may output a signal in the form of vibration.

The haptic module 557 generates various haptic effects that a user is capable of feeling. Representative examples of the haptic effect generated by the haptic module 557 may be a vibration effect.

The memory 560 may store a program for processing and controlling the controller 580 and perform a function of temporally storing input or output data (e.g., a phone book, a still image, a moving picture, etc.)

The interface unit 570 may function as an interface with any external device connected to the mobile terminal 500. The interface unit 570 may receive data or power from an external device, transmit the data or power to each component included in the mobile terminal 500, and transmit data inside the mobile terminal 500 to an external device.

The controller 580 generally controls an operation of each component and controls an overall operation of the mobile terminal 500. For example, the controller 580 may perform related control and processes for voice call, data communication, video call, etc. In addition, the controller 580 may also include a multimedia reproducing module 581 for multimedia reproduction. The multimedia reproducing module 581 may be configured as hardware in the controller 580 and may be separately configured as software from the controller 580.

The power supplier 590 receives external or internal power according to control of the controller 580 and supplies power required for each component.

Figure 5:
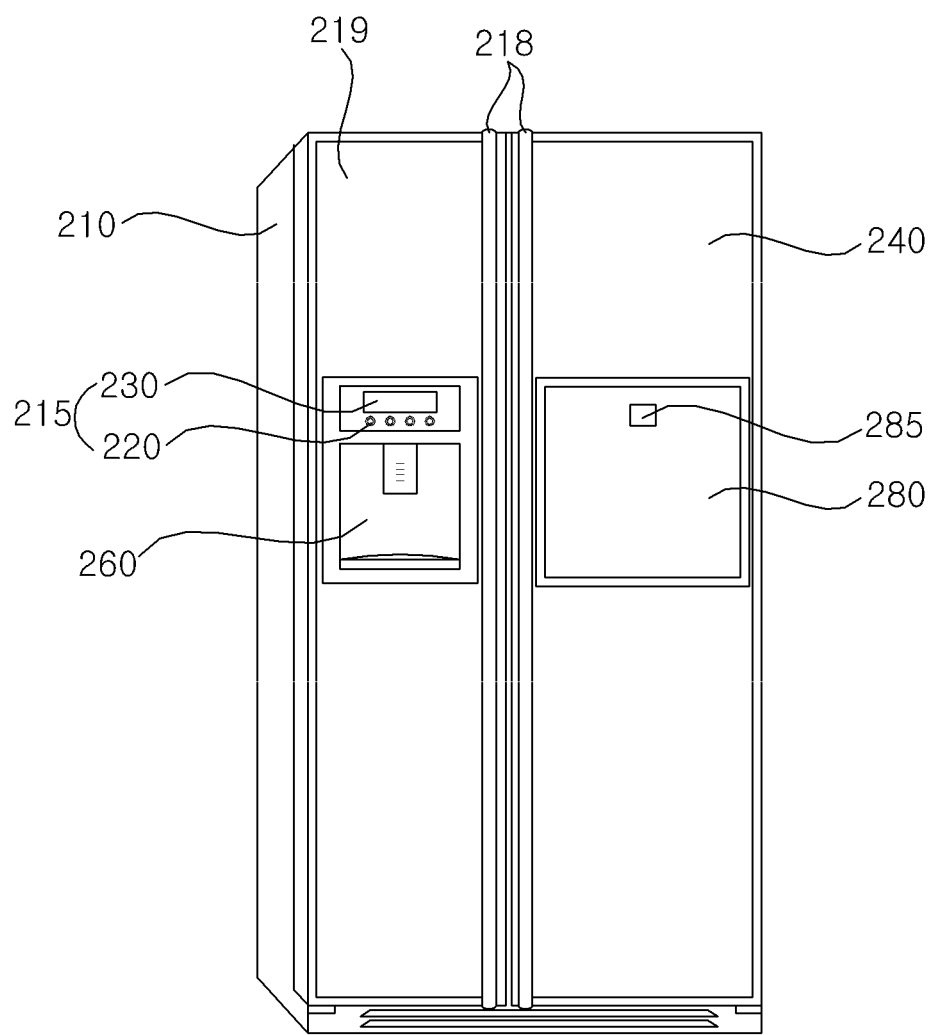
FIG. 5 is a perspective view of a fridge as the home appliance of FIG. 1.

The block diagram of the mobile terminal 500 of FIG. 5 is illustrated for an embodiment of the present invention. Components of the block diagram may be integrated, added, or omitted according to specification of the mobile terminal 500 that is actually embodied. That is, as necessary, two or more components may be integrated as one component or one component may be subdivided and configured into two or more components. In addition, a function performed by each block is for explanation of embodiments of the present invention, and detailed operations and devices may not limit a scope of the present invention.

Hereinafter, embodiments of the present invention will be described in terms of a fridge among home appliances.

FIG. 5 is a perspective view of a fridge 200a as the home appliance 200 of FIG. 1. Referring to FIG. 5, the fridge 200a associated with the present invention forms a schematic outer appearance by a case 210 having an internal space divided into a refrigerator and a freezer, a freezer door 219 for shielding a freezer, and a refrigerator door 240 for shielding a refrigerator, although not shown in FIG. 5.

In addition, a door handle 218 may be further formed to protrude from front surfaces of the freezer door 219 and the refrigerator door 240 to allow a user to easily grasp the fridge 200a and to rotatably move the freezer door 219 and the refrigerator door 240.

A home bar 280 may be further formed on the front surface of the refrigerator door 240 and may be a convenient component that allows the user to take out stored goods such as beverage contained in the fridge 200a without opening the refrigerator door 240.

In addition, a dispenser 260 may be further formed on the front surface of the freezer door 219 and may be a convenient component that allows the user to easily take out ice or drinking water without opening the freezer door 219. A control panel 215 may be further formed above the dispenser 260, may control driving of the fridge 200a, and may display a state of the operating fridge 200a on a screen.

The control panel 215 may include the input unit 220 including a plurality of buttons, and the display 230 for displaying a control image, an operation state, etc.

The display 230 displays information of a control image, an operation state, an inside temperature, etc. For example, the display 230 may display a service type (cubed ice, water, pieced ice) of the dispenser 260, a set temperature of a freezer, and a set temperature of a refrigerator.

The display 230 may be embodied in various forms such as a liquid crystal display (LCD), a light emitting diode (LED), an organic light emitting diode (OLED), etc. In addition, the display 230 may be embodied as a touch screen that is also capable of performing a function of the input unit 220.

The input unit 220 may include a plurality of manipulation buttons. For example, the input unit 220 may include a dispenser setting button (not shown) for setting a service type (cubed ice, water, pieced ice) of the dispenser 260, a freezer temperature setting button (not shown) for setting a temperature of a freezer, and a refrigerator temperature setting button (not shown) for setting a temperature of the refrigerator. The input unit 220 may be embodied as a touch screen that is also capable of performing a function of the display 230.

A fridge associated with embodiments of the present invention is not limited to a double door type illustrated in FIG. 5 and may be embodied in any form of one door type, sliding door type, a curtain door type, etc. as long as the fridge includes a compressor and a fan for a refrigerating cycle or freezing cycle of a fridge.

A communication unit (not shown) may be detachably attached to a rear case of the fridge 200a.

Figure 6:
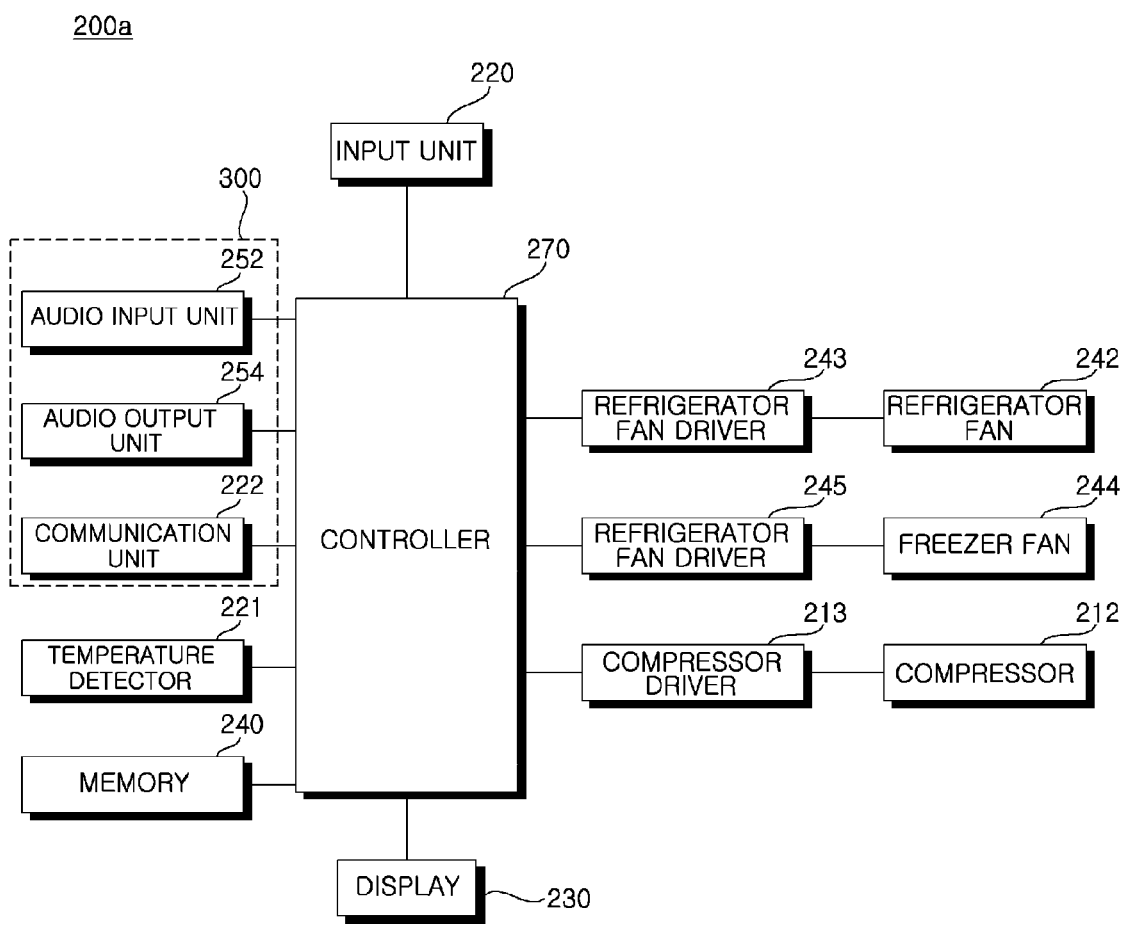
FIG. 6 is a schematic block diagram of an internal structure of a fridge shown in FIG. 5.

FIG. 6 is a schematic block diagram of an internal structure of the fridge 200a shown in FIG. 5.

Referring to FIG. 6, the fridge 200a of FIG. 6 may include a compressor 212, a refrigerator fan 242, a freezer fan 244, the controller 270, a temperature detector 221, the communication unit 222, the memory 240, the input unit 220, the display 230, the audio input unit 252, and the audio output unit 254. In addition, the fridge 200a may further include a compressor driver 213, a refrigerator fan driver 243, and a refrigerator fan driver 245.

The input unit 220 includes a plurality of manipulation buttons and transmits a signal of input freezer setting temperature or refrigerator setting temperature to the controller 270.

The display 230 may display fridge state information according to user input. For example, the display 230 may display a current freezer temperature or refrigerator temperature.

The temperature detector 221 detects a temperature inside the fridge and transmits a signal of the detected temperature to the controller 270. Here, the temperature detector 221 detects the freezer temperature or the refrigerator temperature. In addition, the temperature detector 221 may detect a temperature of each room of a refrigerator or a freezer.

The memory 240 may store various data for an overall operation of the fridge 200a.

The audio input unit 252 may receive user voice. To this end, the audio input unit 252 may include a microphone. The received voice may be converted into an electrical signal and transmitted to the controller 270.

The audio output unit 254 may output an audio signal received by the communication unit 22. To this end, the audio output unit 254 may include a speaker, etc.

The audio output unit 254 may convert an electrical signal from the controller 270 into an audio signal and output the audio signal. For example, the audio output unit 254 may output audio data indicating an operation state of the fridge 200a.

The electrical signal from the controller 270 is converted into an audio signal and output. To this end, a speaker, etc. may be used.

The communication unit 222 may wirelessly communicate with the mobile terminal 500. For example, the communication unit 222 may perform Bluetooth communication. The communication unit 222 may perform pairing with the mobile terminal 500 and after being paired with the mobile terminal 500, may receive audio data and information data from the mobile terminal 500.

The communication unit 222 may be included in the fridge 200a and may be included in the single module 300 along with the audio output unit 254 and the audio input unit 252.

As shown in FIG. 6, the controller 270 may directly control the compressor driver 213 and the fan driver 243 or 245 and may lastly control the compressor 212 and the fan 242 or 244 for control of on/off operation of the the compressor 212 and the fan 242 or 244. Here, the fan driver may be the refrigerator fan driver 243 or the refrigerator fan driver 245.

For example, the controller 270 may include a microcomputer installed therein and output respective corresponding velocity command signals to the compressor driver 213 or the fan driver 243, 245, or 216.

Each of the aforementioned compressor driver 213, refrigerator fan driver 243, and refrigerator fan driver 245 includes a compressor electric motor (not shown), a refrigerator fan electric motor (not shown), and a freezer fan electric motor (not shown). Each electric motor may operate at a target rotation velocity according to control of the controller 270.

When each electric motor is a three-phase motor, the motor may be controlled by a switching operation of an inverter (not shown) or constant-speed controlled using alternating current (AC) power. Here, each electric motor (not shown) may be any one of an induction motor, a blushless DC (BLDC) motor, or a synchronous reluctance motor (synRM).

As described above, the controller 270 may control an overall operation of the fridge 200a as well as an operation of the compressor 212 and the fan 242 or 244. That is, the controller 270 may control an overall operation of refrigerant cycle according to a set temperature from the input unit 220. For example, the controller 270 may further control a 3-direction valve (not shown), a refrigerator expansion valve (not show), a freezer expansion valve (not shown) as well as the compressor driver 213, the refrigerator fan driver 243, and the refrigerator fan driver 245. In addition, the controller 270 may control an operation of a condenser (not shown). In addition, the controller 270 may control an operation of the display 230.

It is difficult to perform code setting for transmission of audio data via ZigBee communication method or a WiFi communication method. However, a Bluetooth communication method may separately transmit information data in addition to audio data. Thus, according to embodiments of the present invention, a home appliance and the mobile terminal 500 may communicate with each other via a Bluetooth communication method.

Figure 7:
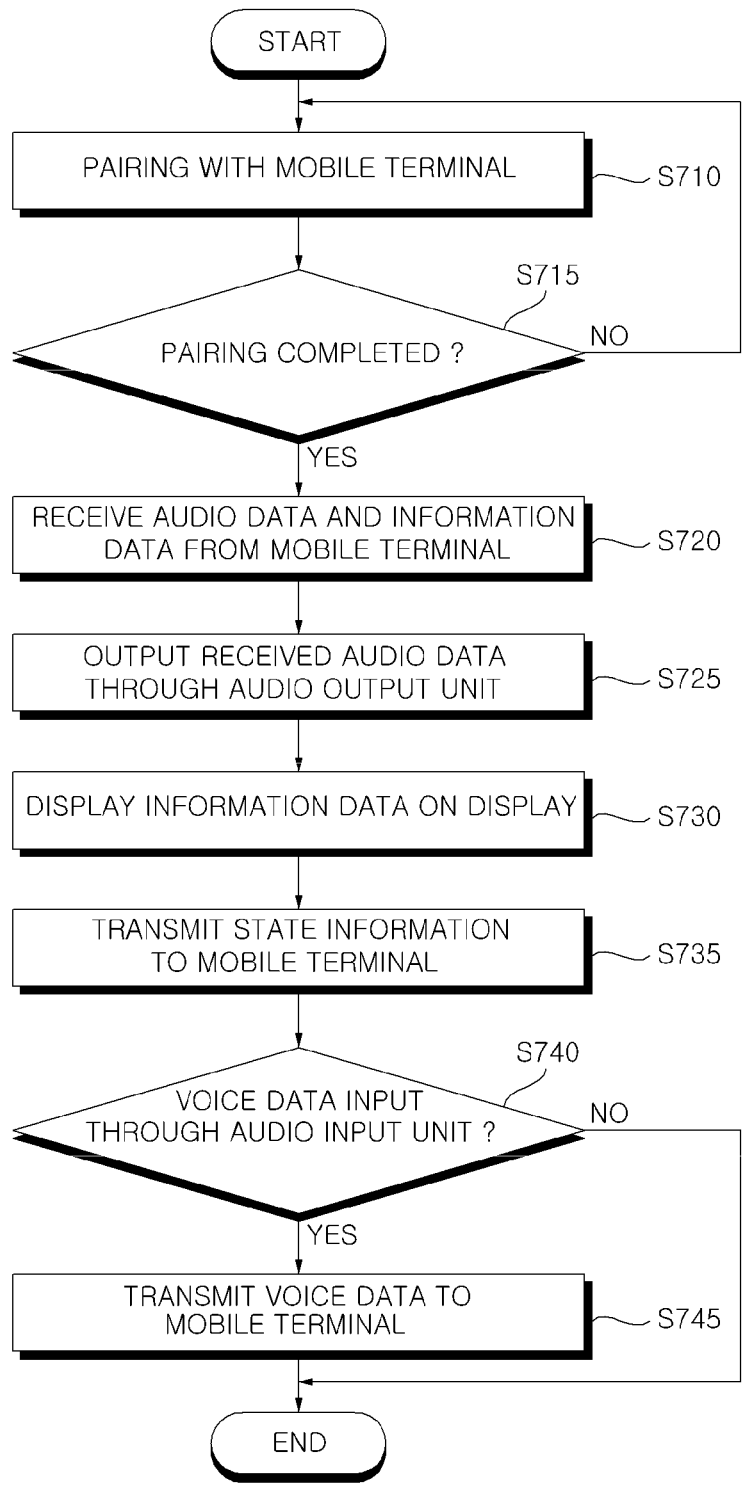
FIG. 7 is a flowchart of an operating method of a home appliance according to an embodiment of the present invention.

FIG. 7 is a flowchart of an operating method of a home appliance according to an embodiment of the present invention. FIGS. 8A to 11B are diagrams for explanation of the operating method of FIG. 7.

Referring to FIG. 7, the home appliance 200 performs pairing with the mobile terminal 500 (S710).

When the mobile terminal 500 executes application associated with the home appliance 200, in particular, remote control application, the mobile terminal 500 and the home appliance 200 may perform pairing.

In this case, when the mobile terminal 500 transmits a pairing request signal to the home appliance 200, the communication unit 222 of the home appliance 200 may transmit a pairing response signal to the mobile terminal 500. In this case, a Bluetooth communication method may be used as a communication method.

The pairing request signal may include information about a plurality of frequency bands and information about a target home appliance, and the pairing response signal may include information about a specific frequency band selected from a plurality of frequency bands, etc.

Figure 8A:
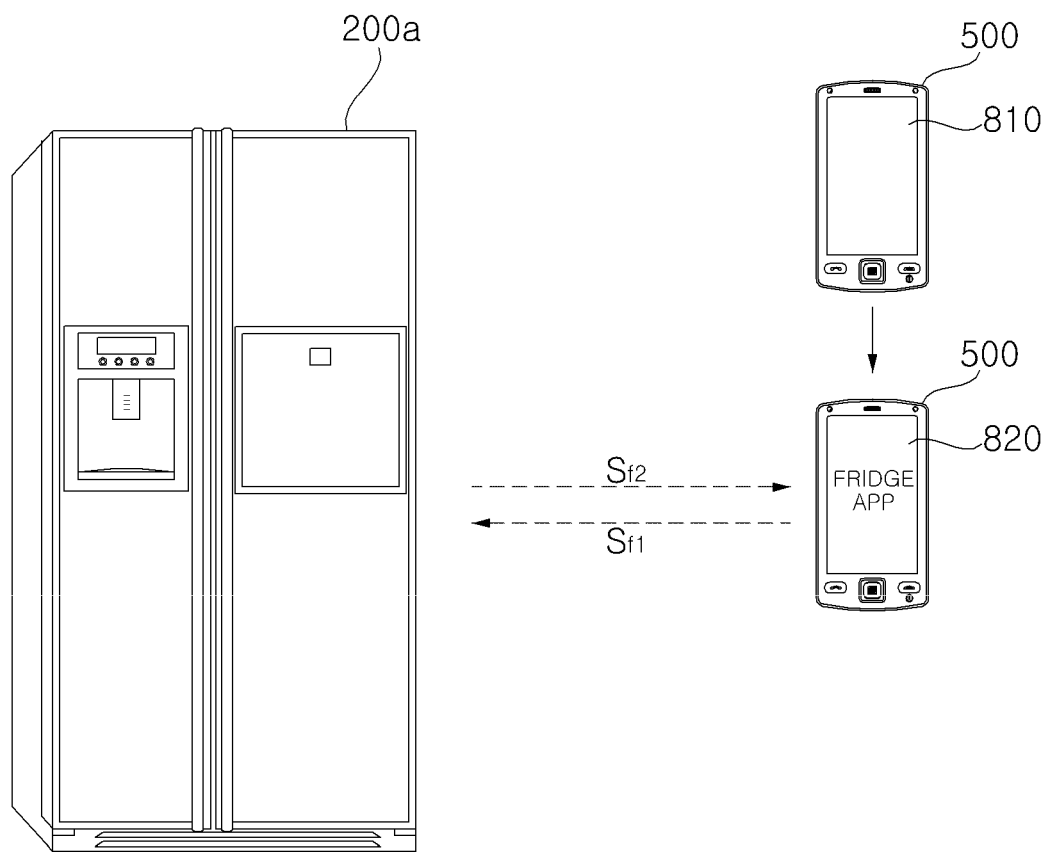
FIGS. 8A to 11B are diagrams for explanation of the operating method of FIG. 7.

FIG. 8A illustrates the case in which pairing between the mobile terminal 500 and the fridge 200a is performed when the mobile terminal 500 executes a fridge related application 820 while a predetermined image 810 is displayed.

In particular, FIG. 8A illustrates the case in which mobile terminal 500 transmits a pairing signal Sf1 to the fridge 200a and the fridge 200a transmits a pairing response signal Sf2 to the mobile terminal 500.

Then the home appliance 200 or the mobile terminal 500 determines whether pairing is completely performed (S715) and after the pairing is completed, receives audio data and information data from the mobile terminal 500 (S720).

The mobile terminal 500 may transmit audio data and information data to the home appliance 200 according to user selection or preset scheduling when the pairing is completed. Thus the communication unit 222 of the home appliance 200 receives audio data and information data from the mobile terminal 500.

The audio data may have various examples such as weather related audio data, New related audio data, schedule related audio data, telephone related data, message related audio data, etc.

The information data may include at least one of time information indicating current time, country information, region information, current temperature information, humidity information, etc. Alternatively, the information data may include a remote control signal.

The information data may include external environment data. In this case, the external environment data may include at least one of time information indicating current time, country information, region information, current temperature information, humidity information, weather information, etc.

When a user manipulates a home appliance, the communication unit 222 of the home appliance 200 may transmit manipulation state information to the mobile terminal 500.

Then the mobile terminal 500 may form the manipulation state information into audio data and transmit the generated audio data to the home appliance 200. Thus the communication unit 222 of the home appliance 200 may receive audio data and information data.

Figure 8B:
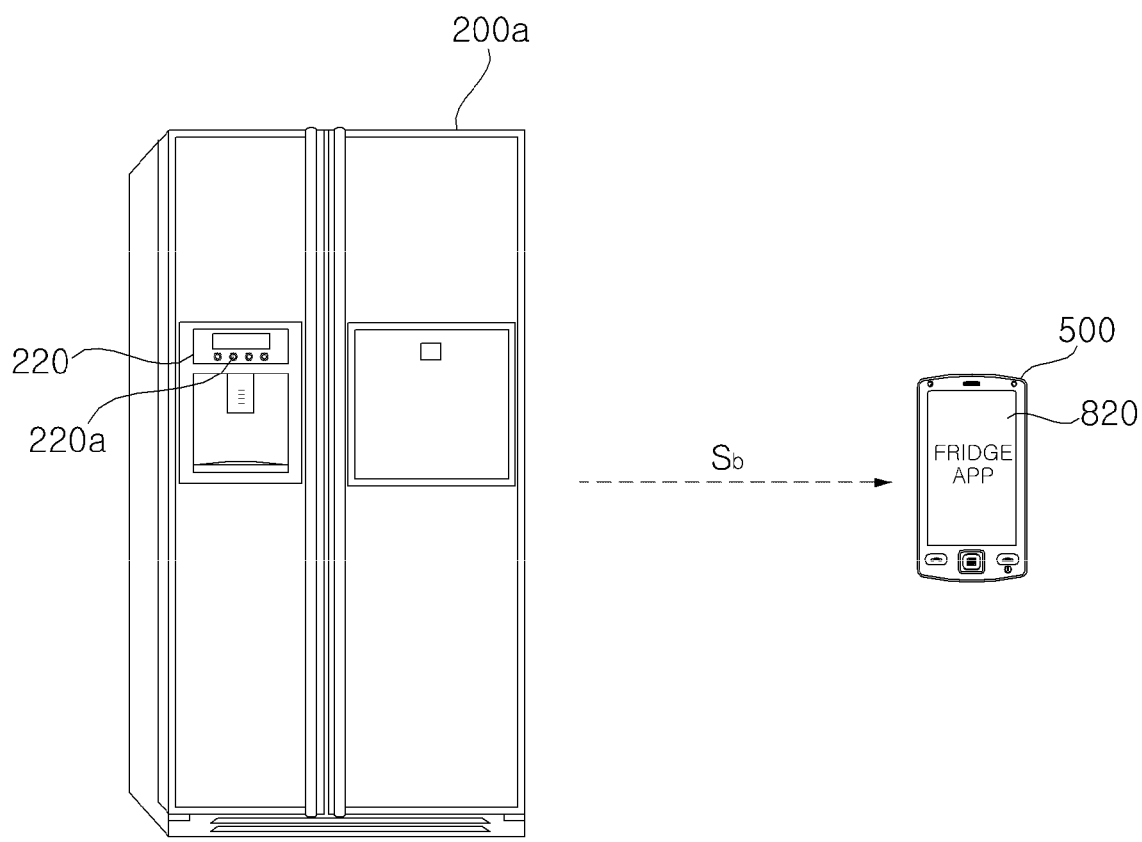

FIG. 8B illustrates the case in which specific manipulation information Sb is transmitted to the mobile terminal 500 during an operation of a specific key 220a of the input unit 220 of the fridge 200a according to user manipulation. In this case, a Bluetooth communication method may be used as a communication method.

Figure 8C:
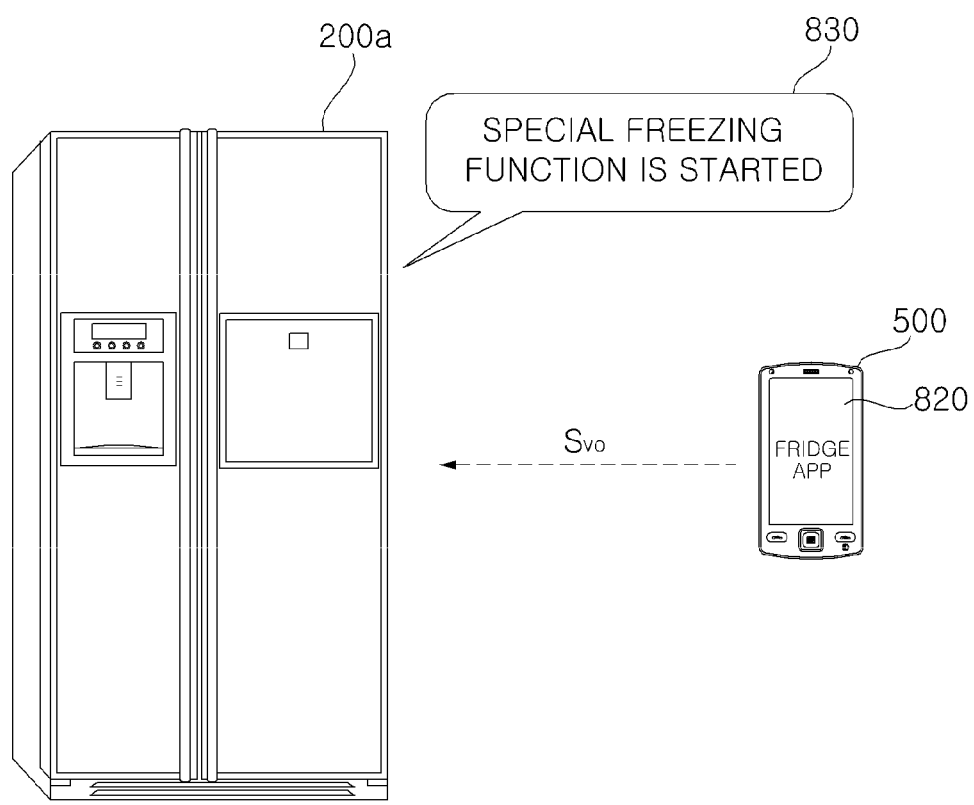

FIG. 8C illustrates the case in which the mobile terminal 500 transmits audio data Svo corresponding to the specific manipulation information Sb to the fridge 200a. Then the communication unit 222 of the fridge 200a may receive the audio data Svo. In this case, a Bluetooth communication method may be used as a communication method.

Then the home appliance 200 outputs the received audio data through an audio output unit (S725). In addition, information data is displayed on the display 230 (S730).

The controller 270 of the home appliance 200 may perform control to output the received audio data through the audio output unit 254 and to display information data on the display 230.

FIG. 8C illustrates the case in which audio data SvO associated with special freezing start is received from the mobile terminal 500 and audio "special freezing function is started" is output through the audio output unit 254 when the specific key 220a of FIG. 8B is input for a key for setting of special freezing.

The audio data may be generated and received from an external device, in particular, the mobile terminal 500 rather than being generated by a fridge to simply perform audio output.

Although not shown, the display 230 may display information data, in particular, time information, and in particular may simultaneously output audio data and display information data.

Then the home appliance 200 transmits state information to the mobile terminal 500.

The home appliance 200 may transmit operation state information of the home appliance 200 to the mobile terminal 500.

Figure 8D:
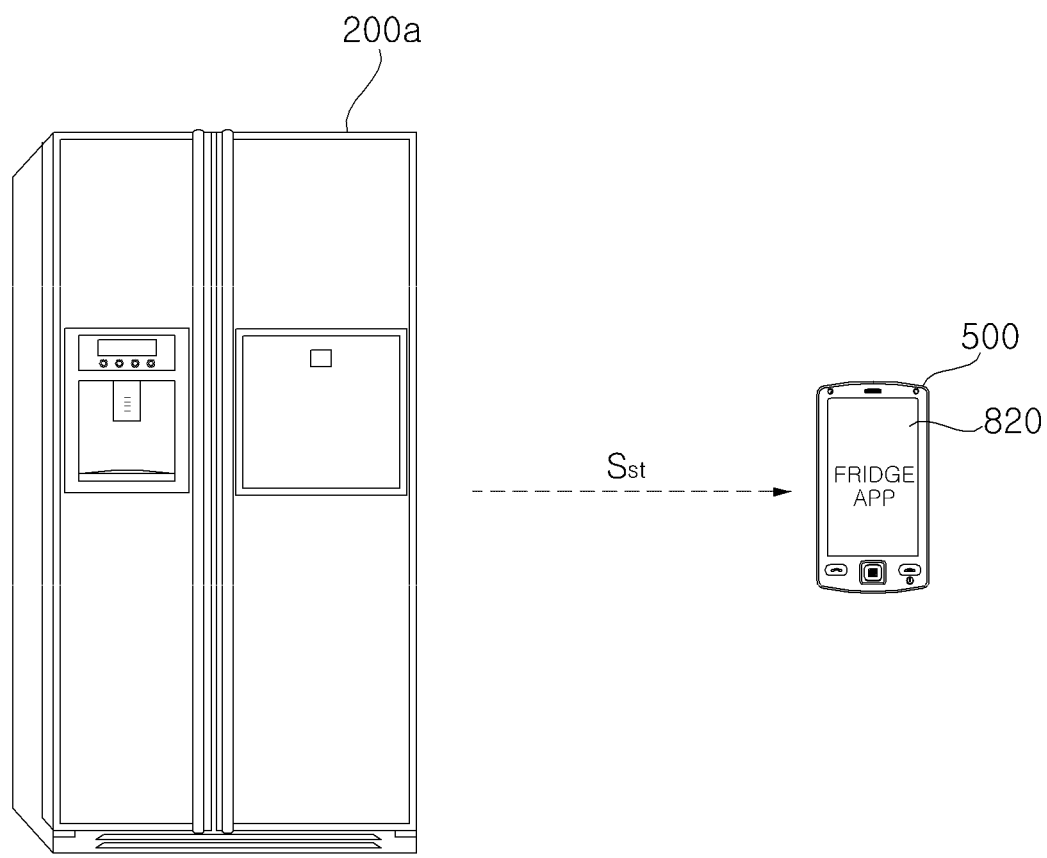

FIG. 8D illustrates the case in which the communication unit 222 of the fridge 200a transmits state information Sst to the mobile terminal 500.

For example, various pieces of state information such as a current refrigerator temperature, a freezer temperature, special freezing start time, elapsed time after special freezing start, a food list stored in a fridge, an expiration date for food, a food list to be purchased, etc. may be transmitted to the mobile terminal 500. Alternatively, malfunction information may be transmitted.

The mobile terminal 500 that receives the above information may recognize a state of the home appliance 200. Although FIG. 8C illustrates the case in which audio data indicating special freezing start is output, various audio data may be output through the audio output unit 254 in a home appliance.

Figure 9A:
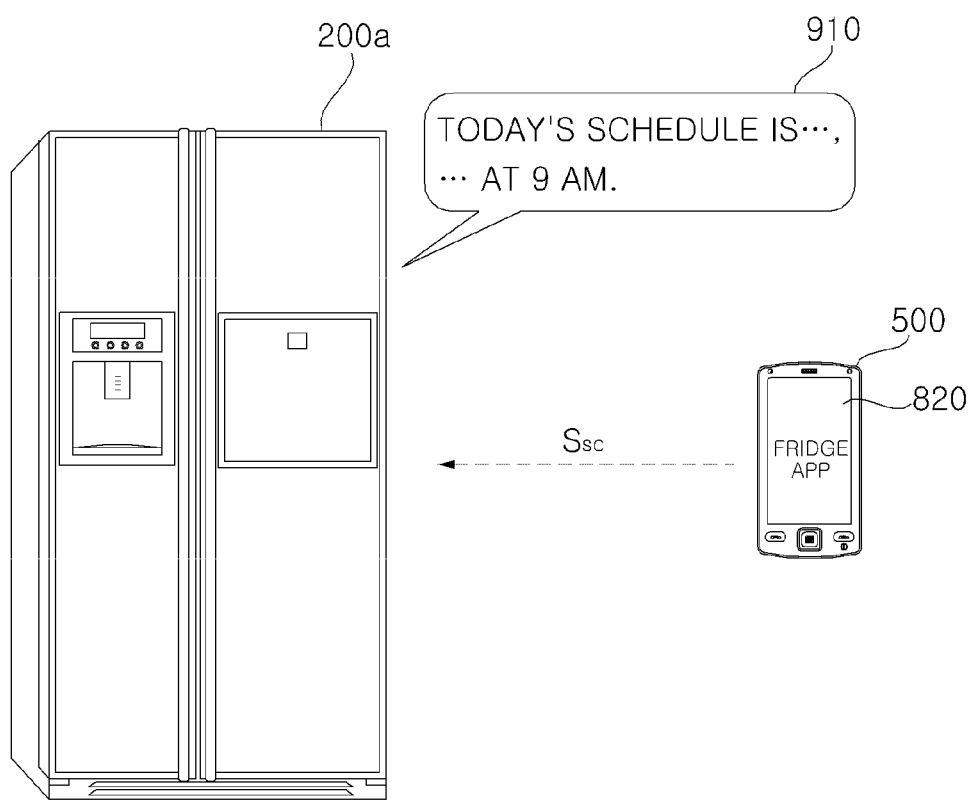

FIG. 9A illustrates the case in which audio data Ssc corresponding to schedule information of a user is received from the mobile terminal 500 and then audio data 910 corresponding to schedule information is output by the audio output unit 254 of the fridge 200a.

Figure 9B:
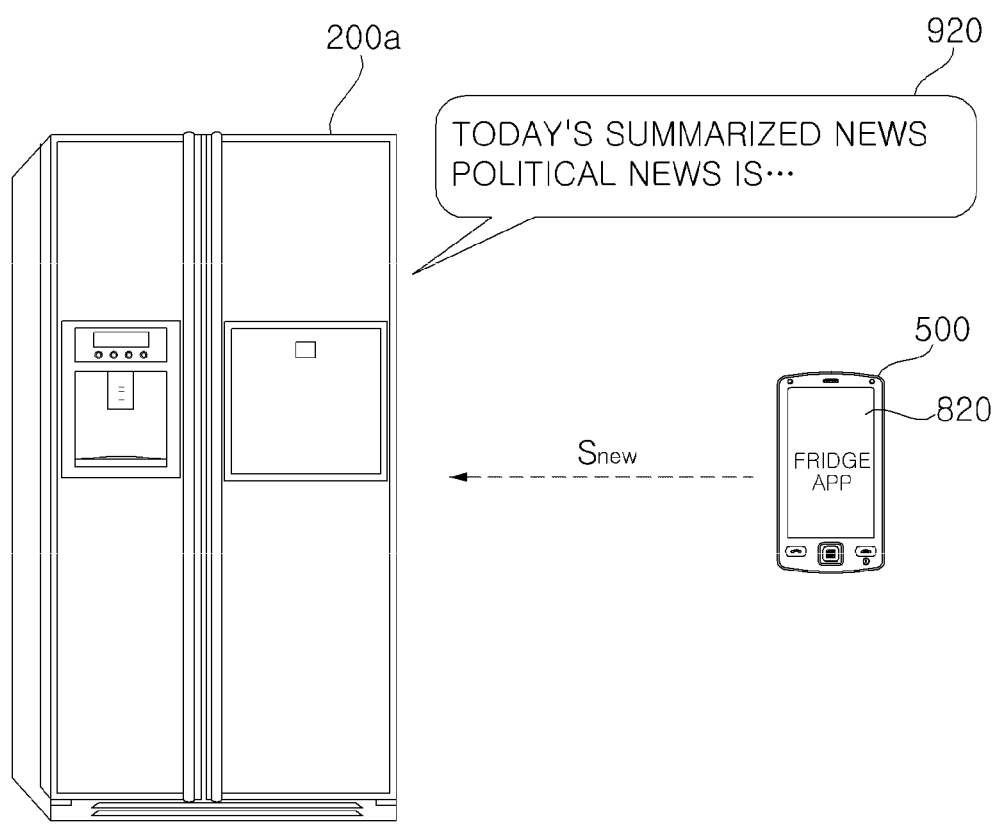

FIG. 9B illustrates the case in which audio data Snew corresponding News information of an interest field preset by a user is received from the mobile terminal 500 and then audio data 920 corresponding to News information is output by the audio output unit 254 of the fridge 200a.

Figure 9C:
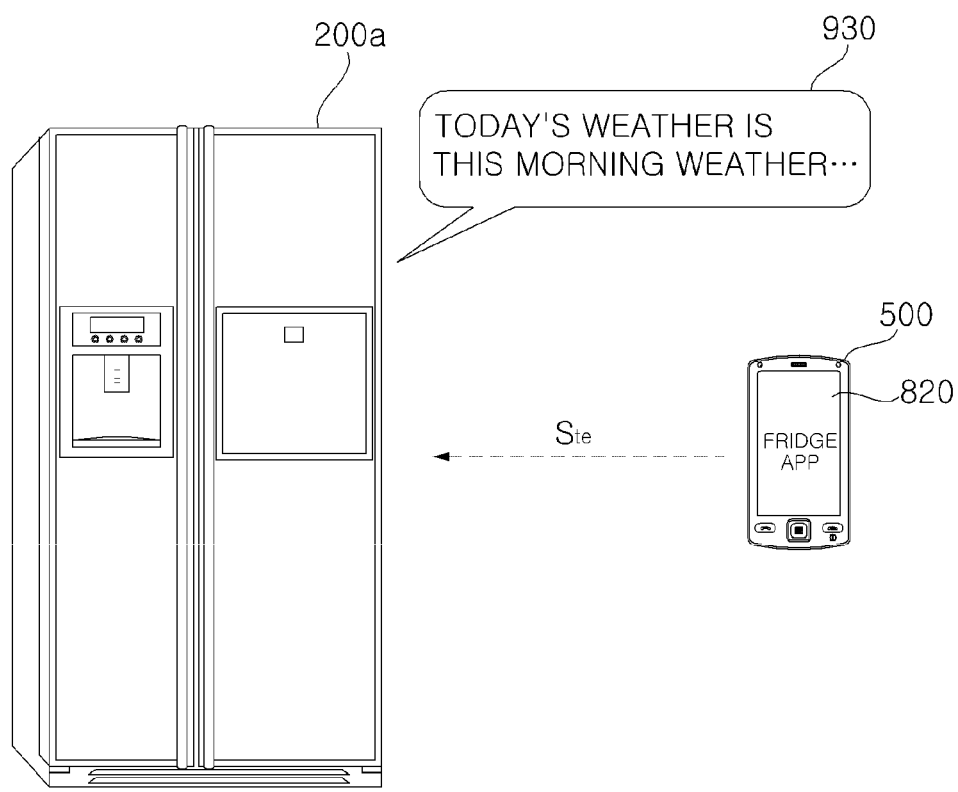

FIG. 9C illustrates the case in which audio data Ste corresponding to weather information is received from the mobile terminal 500 and then audio data corresponding to weather information is output by the audio output unit 254 of the fridge 200a.

Figure 10A:
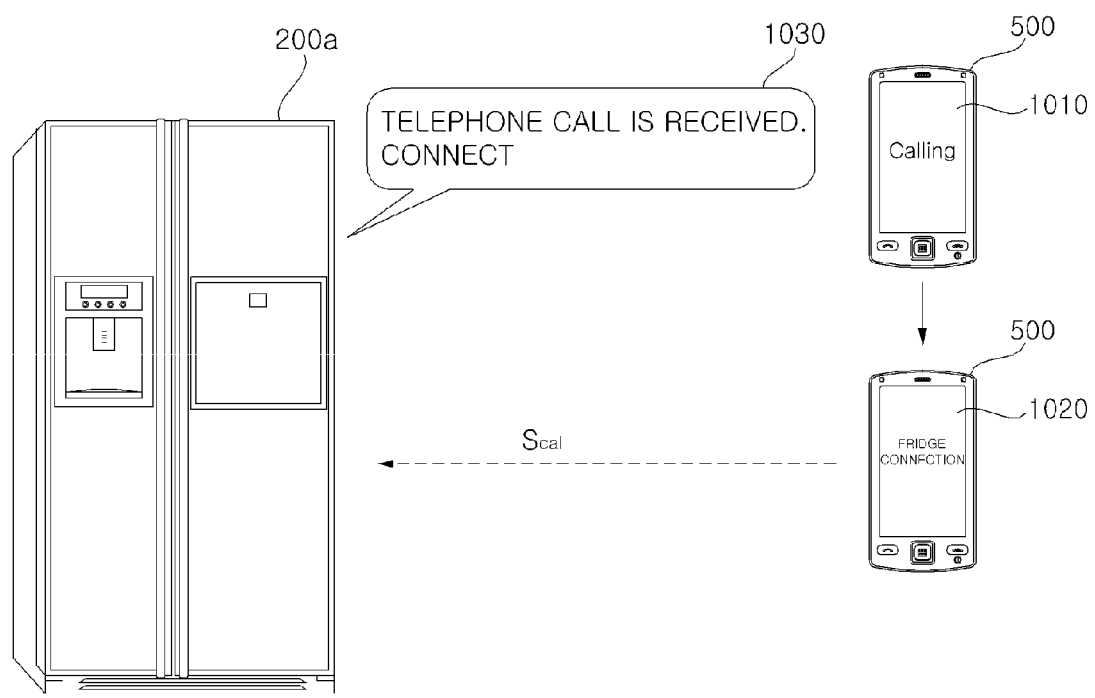

FIG. 10A illustrates the case in which audio data Scal corresponding to call reception is received from the mobile terminal 500 and then audio data 1030 corresponding to call reception is output from the audio output unit 254 of the fridge 200a when a call reception image 1010 is displayed on the mobile terminal 500 according to call, that is, telephone reception and then a fridge bridging shot 1020 is displayed according to user selection.

Then when a user positioned in front of the fridge 200a listens to the audio data 1030 corresponding to call reception and then inputs telephone call connection, telephone call connection may be performed through the fridge 200a.

Figure 10B:
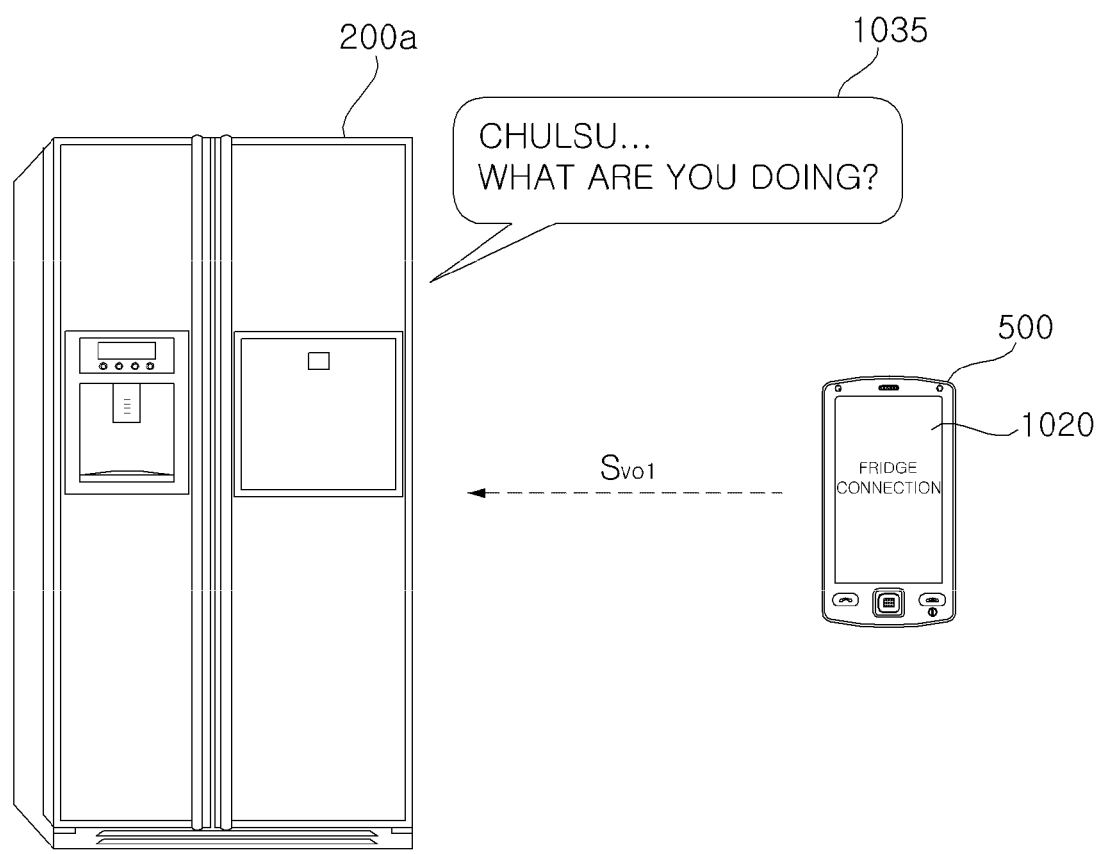

FIG. 10B illustrates the case in which audio data Svo1 associated with telephone is received from the mobile terminal 500 and audio data 1035 associated with telephone is output from the audio output unit 254 of the fridge 200a according to telephone call connection.

When the home appliance 200 receives voice data through an audio input unit (S740), the voice data may be transmitted to the mobile terminal 500 (S745).

When a user pushes a predetermined key of the input unit 220 of a fridge and outputs voice data, the audio input unit 252 may receive corresponding voice data. In addition, the received voice data may be transmitted to the mobile terminal 500 through the communication unit 222.

Figure 10C:
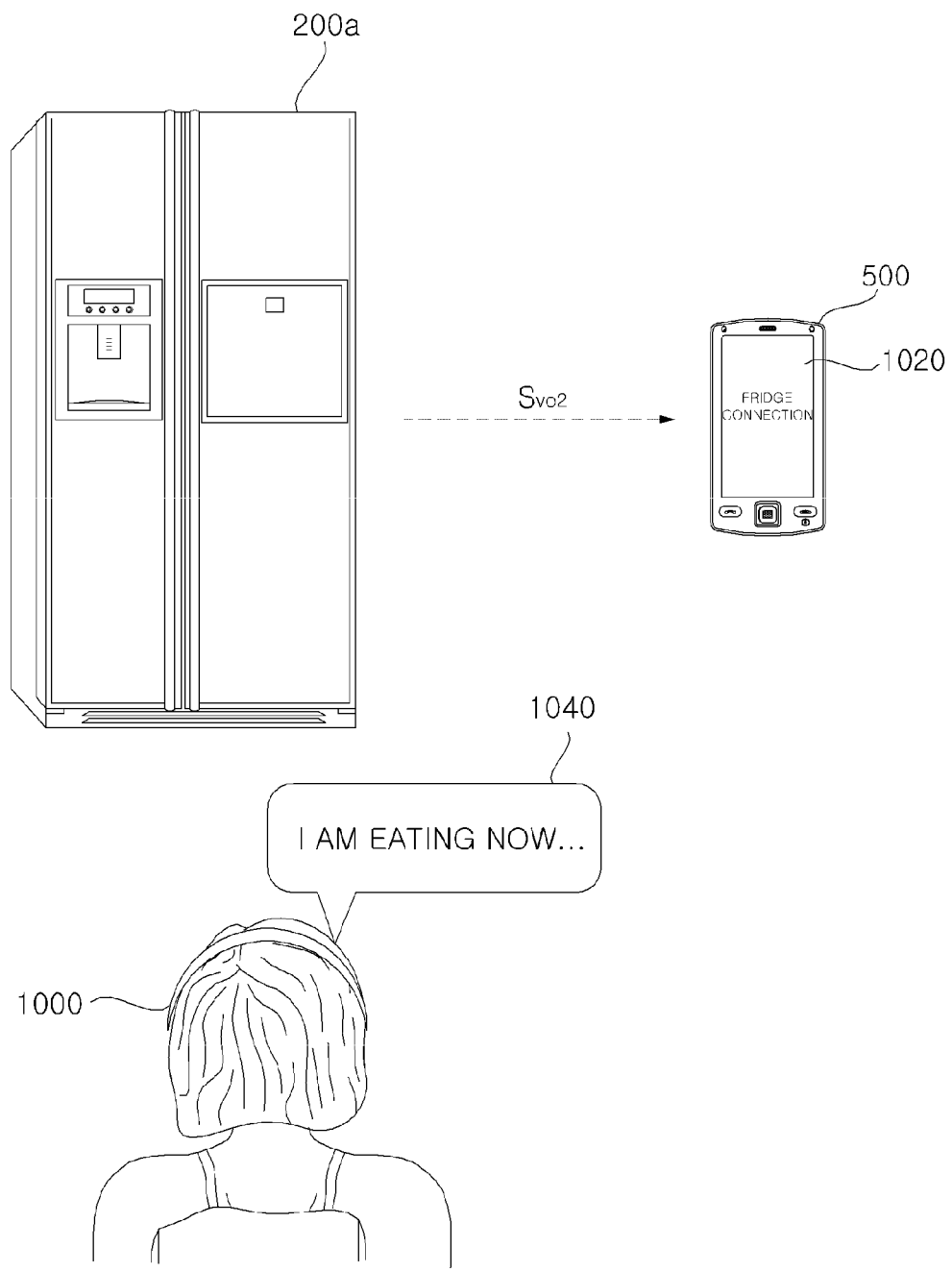

FIG. 10C illustrates the case in which voice data Svo2 is transmitted to the mobile terminal 500 from the communication unit 222 of the fridge 200a when a user 1000 outputs predetermined voice 1040. In conjunction with FIG. 10B, telephone call may be possible through the fridge 200a using this method.

Figure 11A:
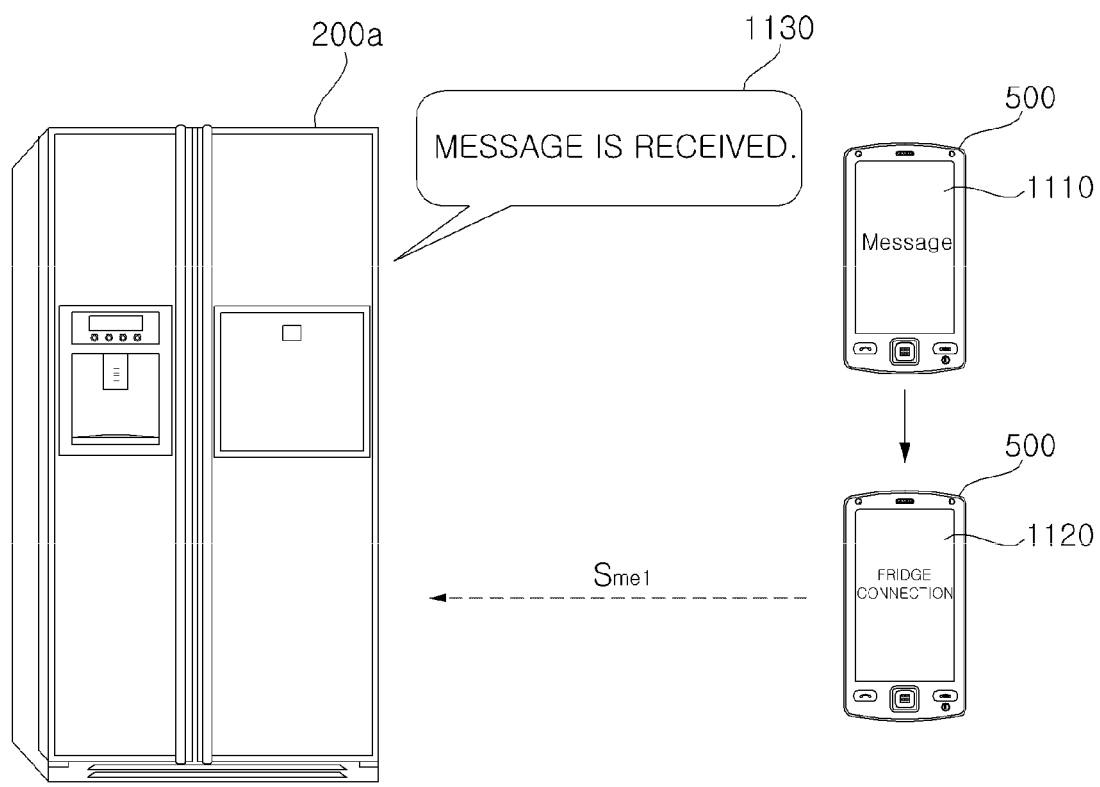

Then FIG. 11A illustrates the case in which audio data Sme1 corresponding to message reception is received from the mobile terminal 500 and then audio data 1130 corresponding to message reception is output by the audio output unit 254 of the fridge 200a when a message reception image 1110 is displayed on the mobile terminal 500 according to message reception and then a fridge bridge image 1120 is displayed according to user selection, similarly to FIG. 10A.

Figure 11B:
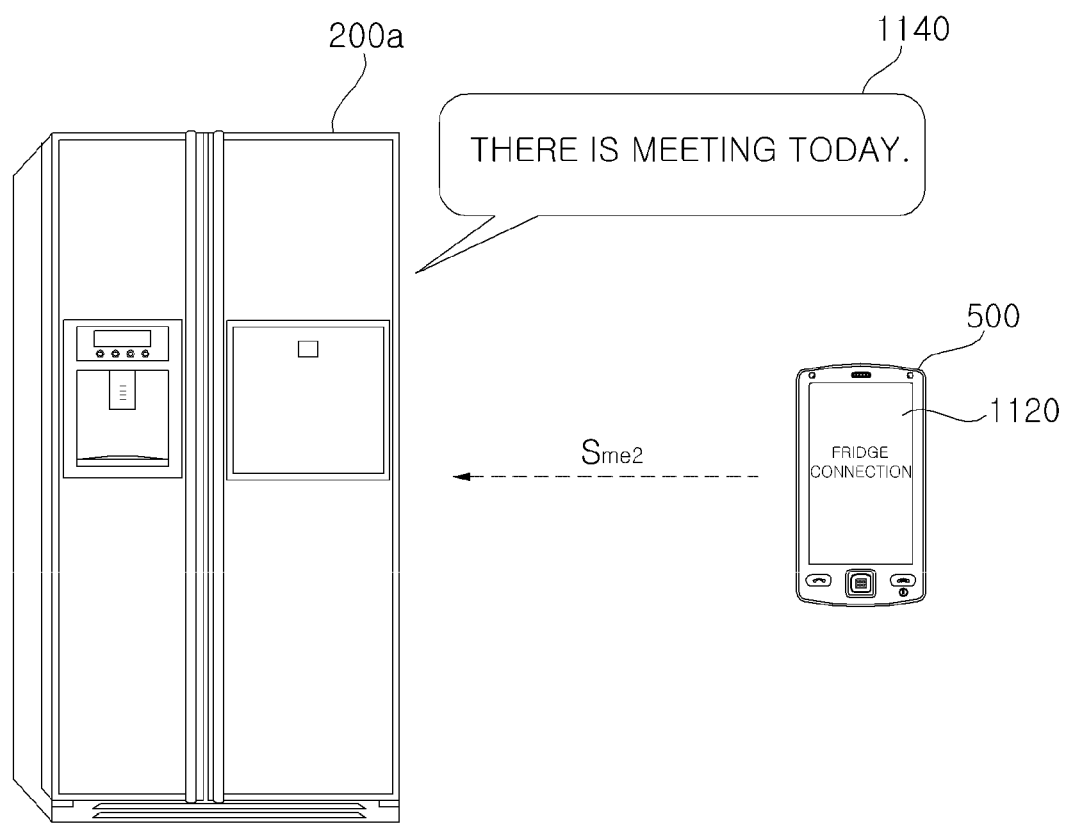

FIG. 11B illustrates the case in which audio data Sme2 associated with a message is received from the mobile terminal 500 and audio data 1140 associated with the message is output by the audio output unit 254 of the fridge 200a according to message reception connection.

The controller 270 may perform control to calculate related information based on external environment data of information data and to output the calculated related information. For example, the controller 270 may perform to output the calculated related information in the form of audio through the audio output unit 254 or control to display the calculated related information through the display 230.

The case in which the related information is calculated based on the external environment data and the calculated related information is output will be described in more detail with reference to FIG. 12.

Figure 12:
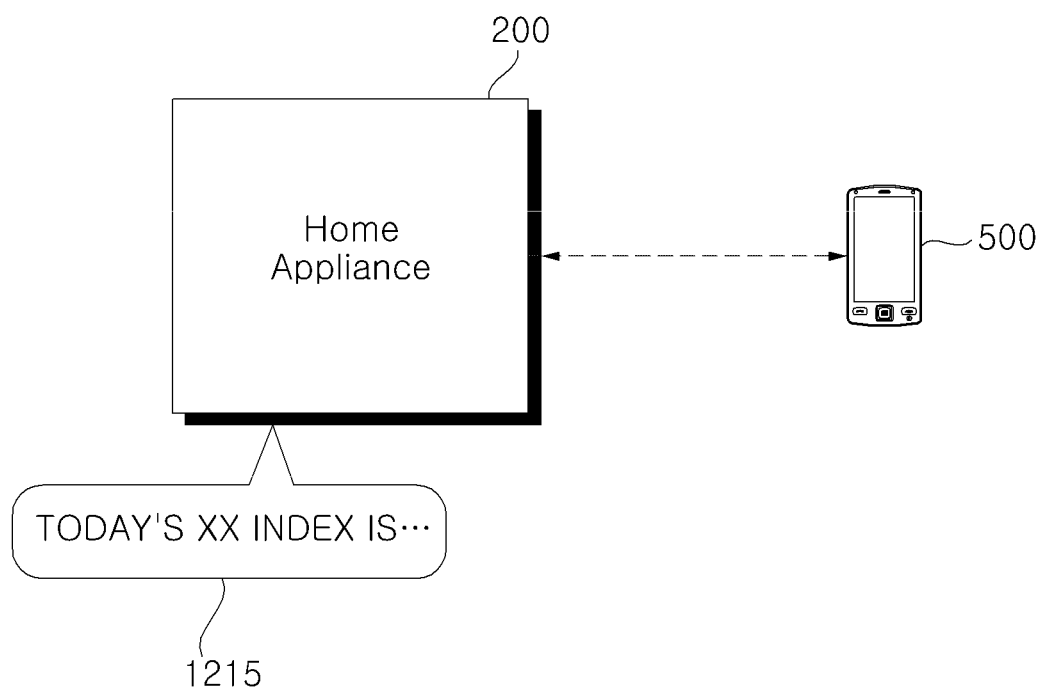
FIG. 12 is a diagram of a structure of a home appliance and a mobile terminal according to another embodiment of the present invention.

FIG. 12 is a diagram of a structure of a home appliance 200 and a mobile terminal 500 according to another embodiment of the present invention.

Referring to FIG. 12, the home appliance 200 according to an embodiment of the present invention may wirelessly communicate with the mobile terminal 500.

In particular, after being paired with the mobile terminal 500, the home appliance 200 may receive signal-processed external environment data from the mobile terminal 500.

In addition, the home appliance 200 may calculate related information using the received external environment data and display the calculated related information through a display or display the calculated related information in the form of audio through an audio output unit.

FIG. 12 illustrates index related audio data such as "Today's index is , , ," 1215. In this case, related information may include at least one of a food poisoning index, a discomfort index, a car wash index, an ultraviolet index, and a laundry washing index.

The calculated related information may be transmitted to the mobile terminal 500.

The home appliance 200 and the mobile terminal 500 communicate with each other via a wireless data communication method for transmitting the external environment data, for example, Bluetooth. Other various communication methods may also be used.

Figure 13:
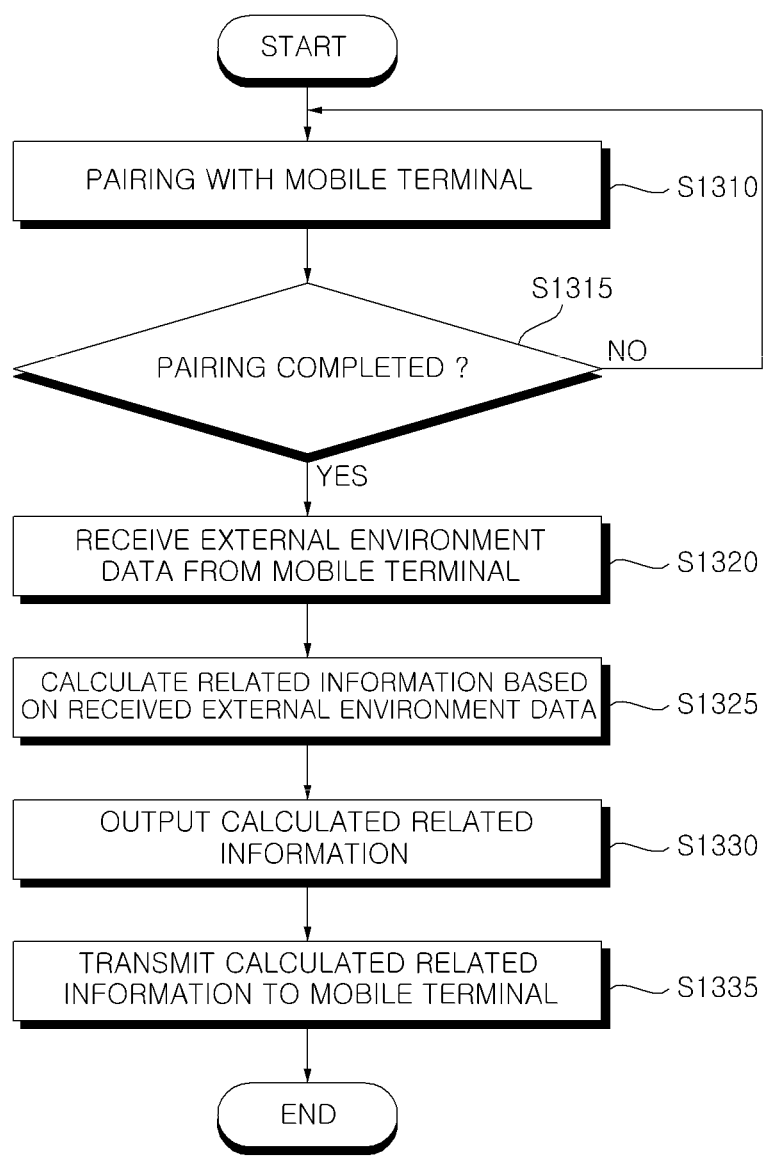
FIG. 13 is a flowchart illustrating an operating method of a home appliance according to an embodiment of the present invention.

FIG. 13 is a flowchart illustrating an operating method of a home appliance according to an embodiment of the present invention. FIGS. 14A to 16D are diagrams for explaining the operation of FIG. 13.

Referring to FIG. 13, the home appliance 200 may perform pairing with the mobile terminal 500 (S1310).

When the mobile terminal 500 executes application associated with the home appliance 200, in particular, remote control application, the mobile terminal 500 and the home appliance 200 may perform pairing.

In this case, when the mobile terminal 500 transmits a pairing request signal to the home appliance 200, the communication unit 222 of the home appliance 200 may transmit a pairing response signal to the mobile terminal 500. In this case, a Bluetooth communication method may be used as a communication method.

The pairing request signal may include information about a plurality of frequency bands and information about a target home appliance, and the pairing response signal may include information about a specific frequency band selected from a plurality of frequency bands, etc.

Figure 14A:
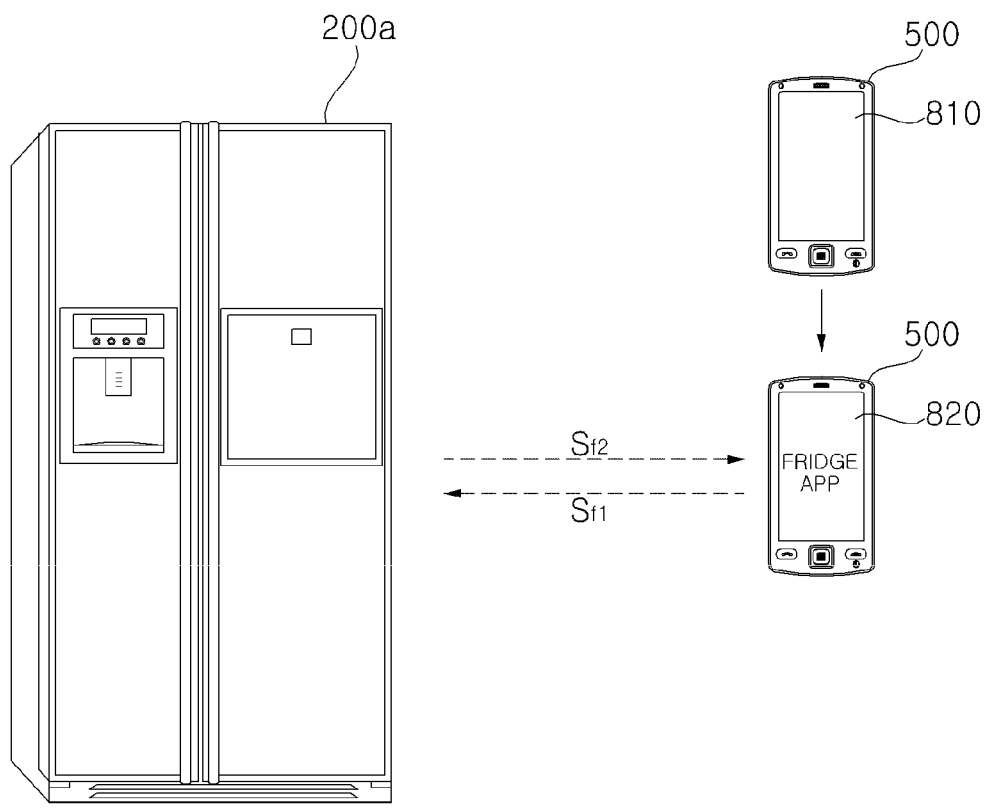
FIGS. 14A to 16D are diagrams for explaining the operation of FIG. 13.

FIG. 14A illustrates the case in which pairing between the mobile terminal 500 and the fridge 200a is performed when the mobile terminal 500 executes the fridge related application 820 while the predetermined image 810 is displayed.

In particular, FIG. 14A illustrates the case in which the mobile terminal 500 transmits the pairing signal Sf1 the fridge 200a to the fridge 200a and the fridge 200a transmits the pairing response signal Sf2 to the mobile terminal 500.

Then the home appliance 200 or the mobile terminal 500 determines whether pairing is completely performed (S1315) and after the pairing is completed, receives external environment data from the mobile terminal 500 (S1320).

The mobile terminal 500 may transmit external environment data to the home appliance 200 according to user selection or preset scheduling when the pairing is completed. Thus the communication unit 222 of the home appliance 200 receives external environment data from the mobile terminal 500. Audio data may also be received along with the external environment data.

The external environment data may include at least one of at least one of time information indicating current time, country information, region information, current temperature information, humidity information, weather information, etc.

The audio data may have various examples such as weather related audio data, News related audio data, schedule related audio data, telephone related data, message related audio data, etc.

When a user manipulates a home appliance, the communication unit 222 of the home appliance 200 may transmit the manipulated state information to the mobile terminal 500.

Figure 14B:
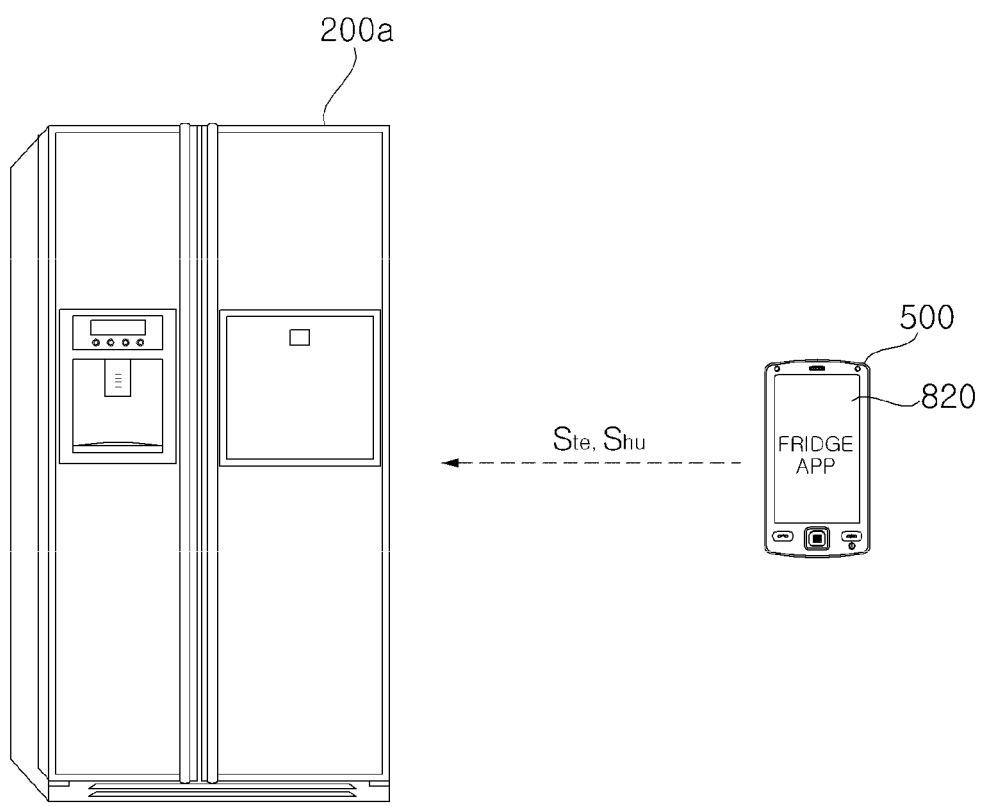

FIG. 14B illustrates the case in which the communication unit 222 of the fridge 200a receives current temperature information Ste and humidity information Shu are received from the mobile terminal 500. In this case, a Bluetooth communication method may be used as a communication method.

Then the home appliance 200 calculates related information based on received external environment data (S1325). In addition, the home appliance 200 outputs the calculated related information (S1330).

The controller 270 of the home appliance 200 may calculate the related information based on the received external environment data. For example, at least one of a food poisoning index, a discomfort index, a car wash index, an ultraviolet index, and a laundry washing index may be calculated.

Like in FIG. 14B, upon receiving the current temperature information Ste and the humidity information Shu, the controller 270 of the fridge 200a may calculate a food poisoning index as related information based on the current temperature information Ste and the humidity information Shu.

Figure 14C:
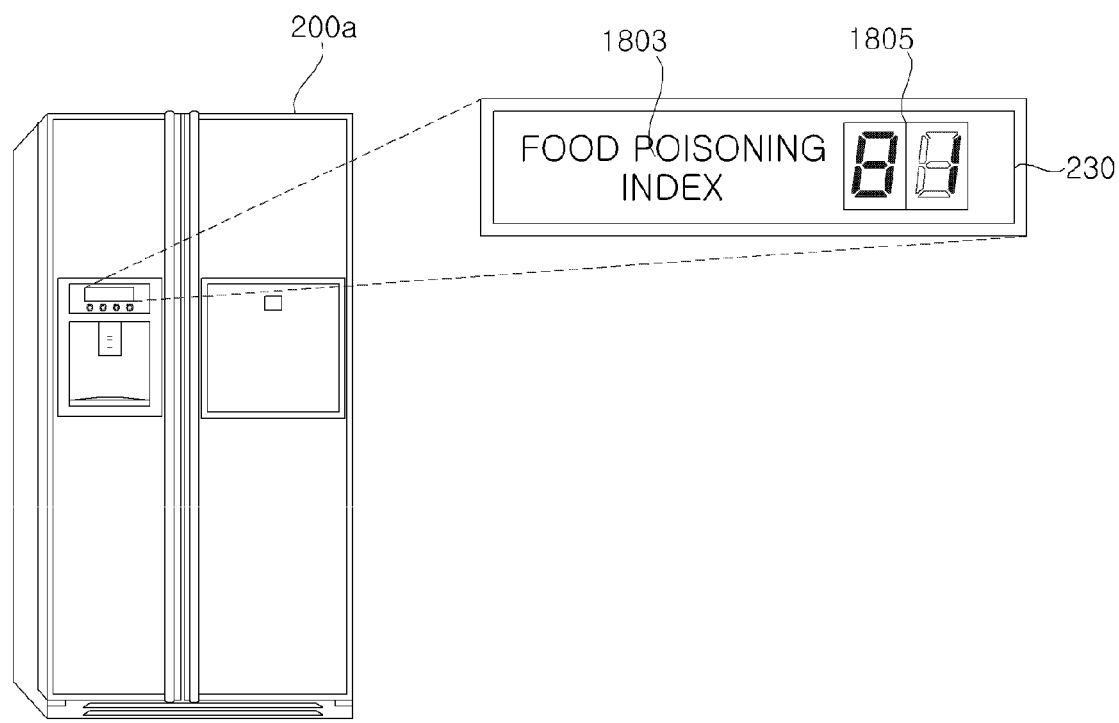
Figure 14D:
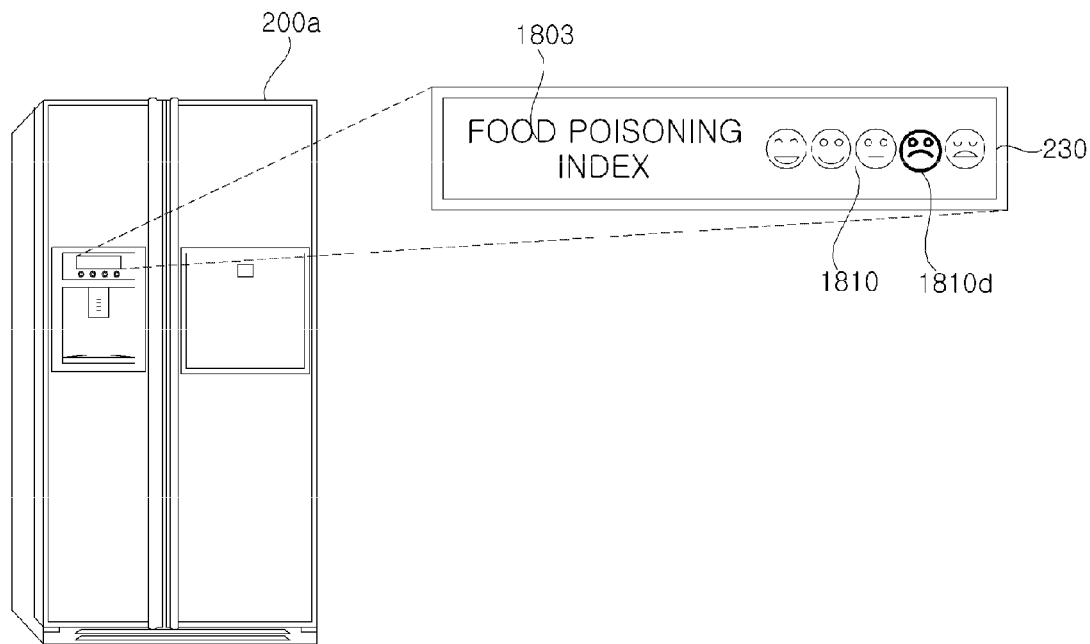

In addition, the calculated food poisoning index may be displayed on the display 230 like in FIG. 14C. FIG. 14C illustrates the case in which a food poisoning index item 1803 and food poisoning index information 1805 are displayed together in the display 230. Thus a user may simply check the food poisoning index.

Although FIG. 14C digitizes and illustrates food poisoning index information, other methods for representing the food poisoning index information may be possible. Like in FIG. 14D, the food poisoning index item 1803 and icons 1810 indicating a food poisoning index may be disposed in the display 230. FIG. 14C illustrates the case in which a corresponding icon 1810d among a plurality of icons 1810 is highlighted.

Figure 14E:
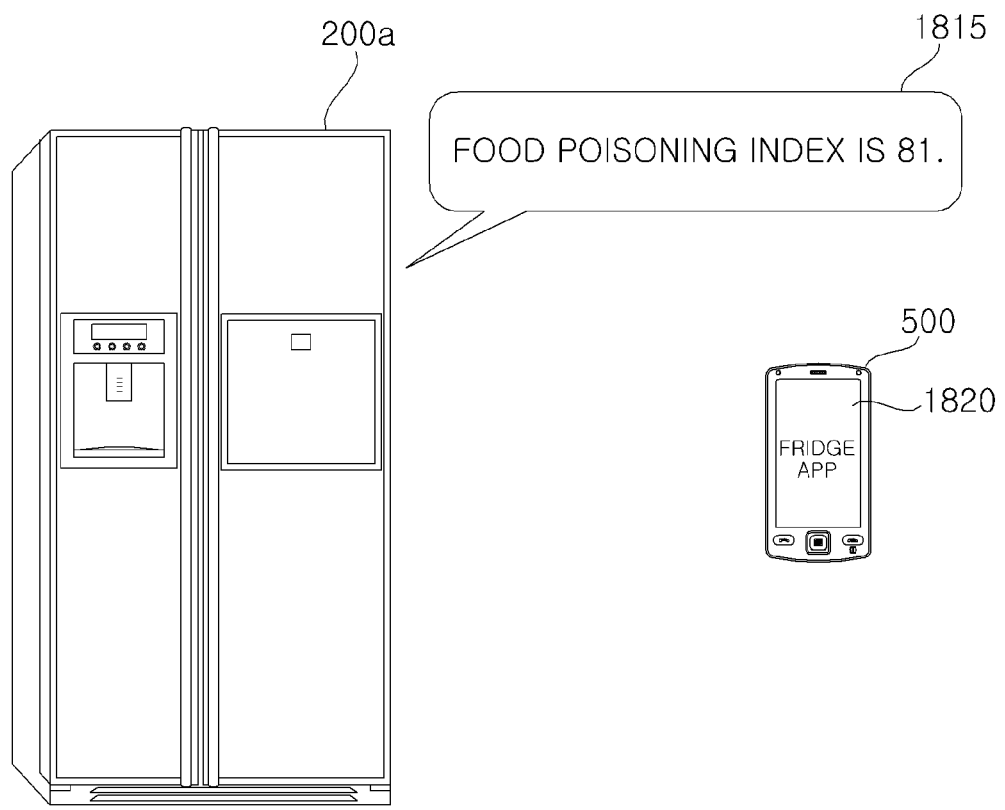

FIG. 14E illustrates the case in which a food poisoning index is output in the form of audio 1815 through the audio output unit 254. Display output and audio output may be simultaneously performed.

During audio output, a food poisoning index is output in the form of numbers and also any one of a plurality of announcements such as "Don't leave food reserve for long time", "Store in fridge if possible", "Store in fridge", and "Immediately store in fridge" may be output.

As such, a home appliance may receive external environment data and output calculated related information, thereby improving user convenience.

Then the home appliance 200 transmits the calculated related information to the mobile terminal 500 (S1335).

The home appliance 200 may transmit the related information calculated by the home appliance 200 to the mobile terminal 500.

Figure 15A:
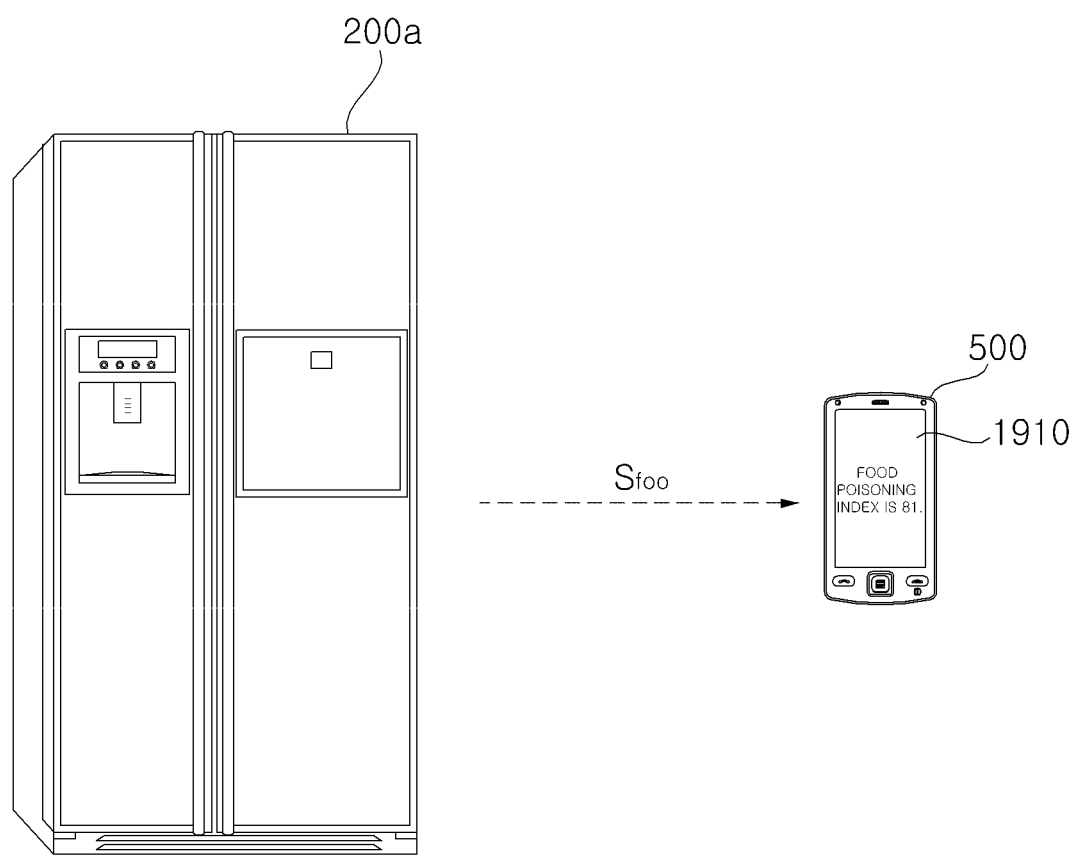
Figure 15B:
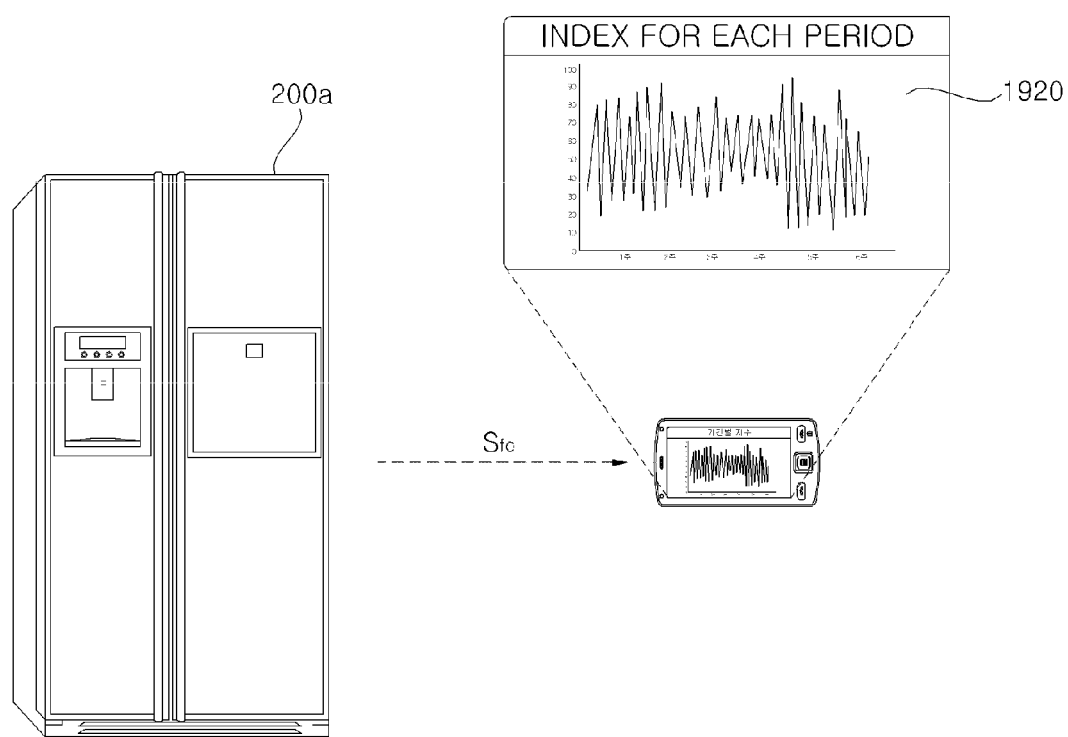

FIG. 15A illustrates the case in which the communication unit 222 of the fridge 200a transmits calculated related information Sfoo to the mobile terminal 500. The mobile terminal 500 may receive calculated related information and then may immediately display corresponding information as shown in FIG. 15A. FIG. 15A illustrates the case in which a food poisoning index image 1910 is displayed on the mobile terminal 500.

Calculated related information Sfo1 may be periodically transmitted to the mobile terminal 500 and thus the mobile terminal 500 may display related information acquired for a predetermined period of time as an index image 1920 for each period. Thus a user may simply check an index for each period through the mobile terminal 500.

In addition to the mobile terminal 500, the home appliance 200 may also output an index for each period. For example, the display 230 may display an index graph for each period similar to the index image 1920 for each period of the mobile terminal 500.

The communication unit 222 of the fridge 200a may transmit fridge state information to the mobile terminal 500 as well as transmit calculated related information.

For example, various pieces of state information such as current fridge temperature, freezer temperature, start time of special freezer, elapsed time after start of special freezing, a food list stored in a fridge, an expiration date for food, a food list to be purchased, etc. to the mobile terminal 500. Alternatively, malfunction information may be transmitted.

The mobile terminal 500 that receives the above information may recognize a state of the home appliance 200.

Although FIGS. 14A to 14E illustrate the case in which a food poisoning index generated according to reception of external environment data reception is output, various indexes may be generated and output.

Figure 16A:
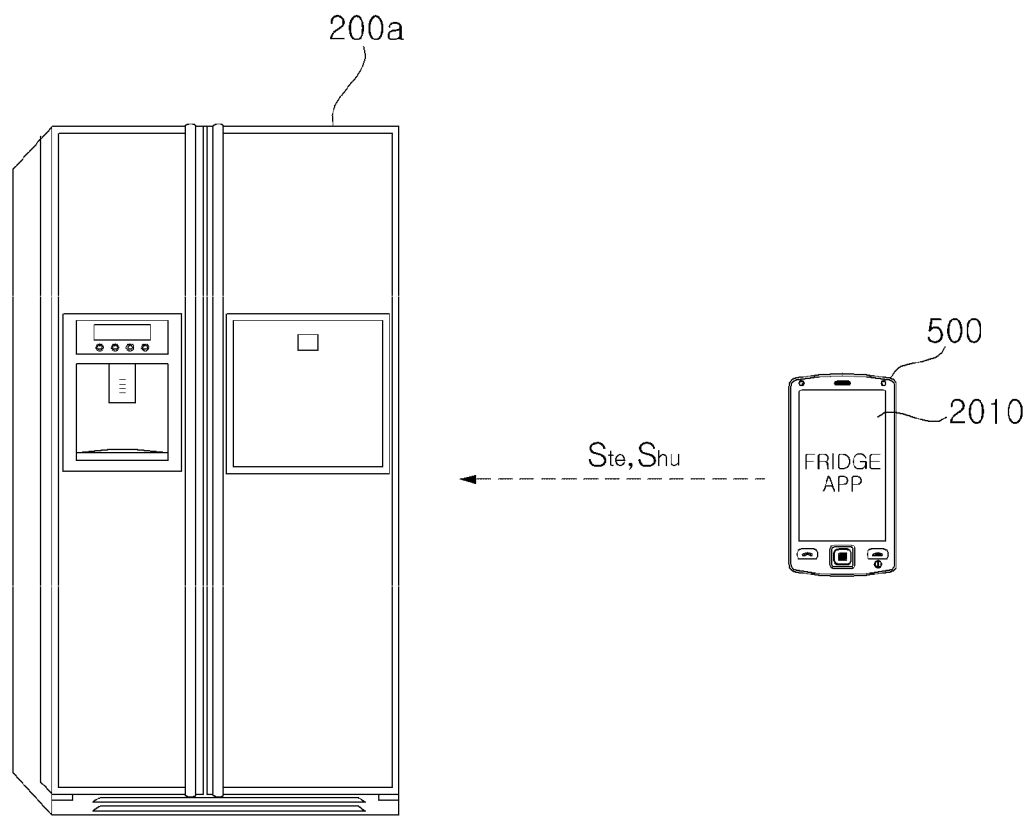

FIG. 16A illustrates the case in which current temperature information Ste and humidity information Shu are transmitted to the fridge 200a from the mobile terminal 500 driven by a fridge application 2010.

The controller 270 of the fridge 200a may calculate a discomfort index as related information based on current temperature information Ste and humidity information Shu.

Figure 16B:
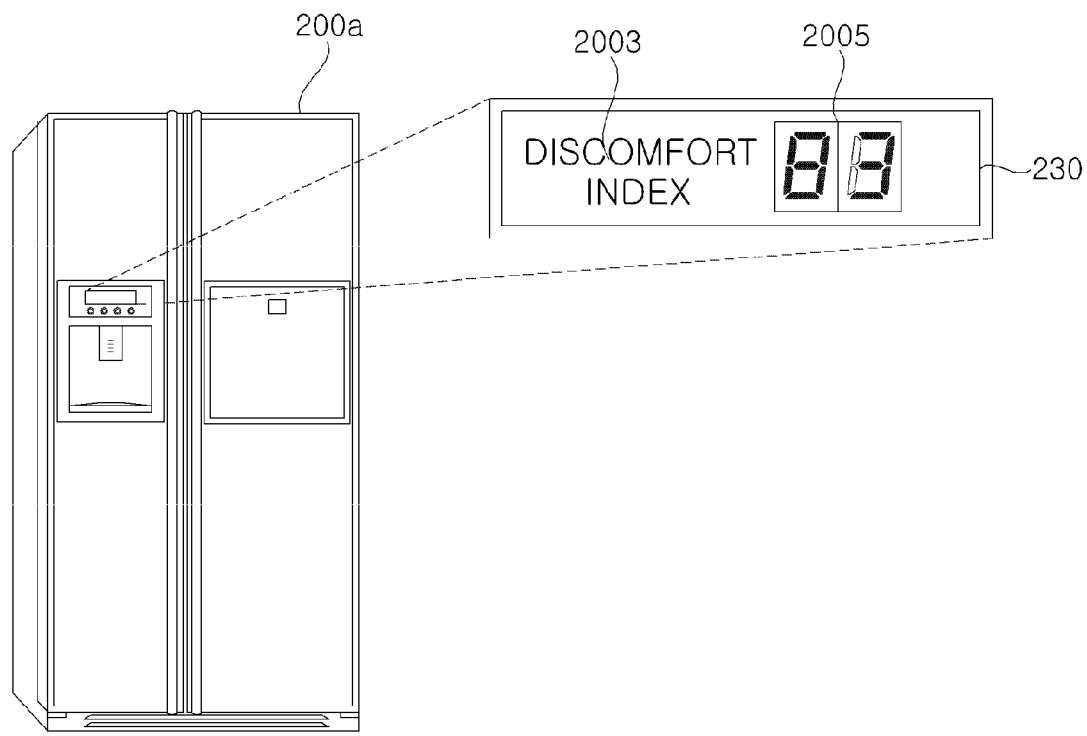

In addition, the calculated discomfort index may be displayed on the display 230 as shown in FIG. 16B. FIG. 16B illustrates the case in which the display 230 displays a discomfort index item 2003 and discomfort index information 2005 together. The user may simply check the discomfort index.

Although FIG. 16B illustrates the case in which the discomfort index information is digitized, icons indicating the discomfort index may be displayed.

Figure 16C:
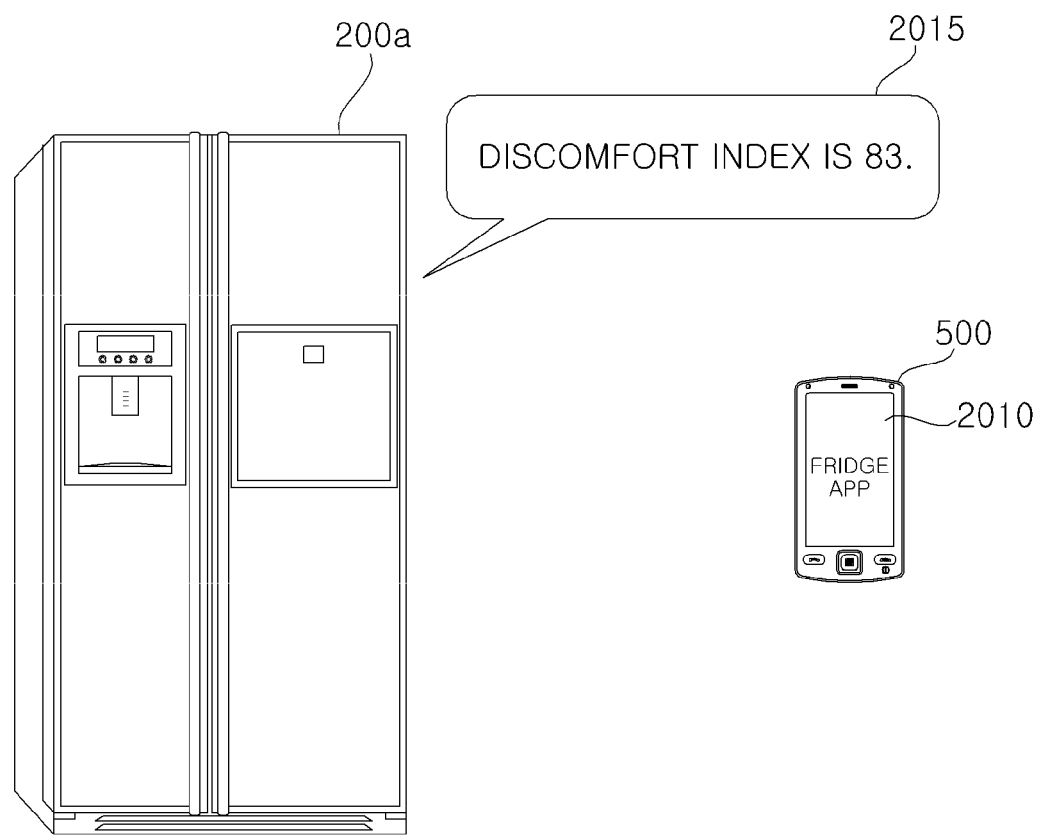

FIG. 16C illustrates the case in which a discomfort index is output in the form of audio 2015 through the audio output unit 254. Display output and audio output may be simultaneously performed.

Figure 16D:
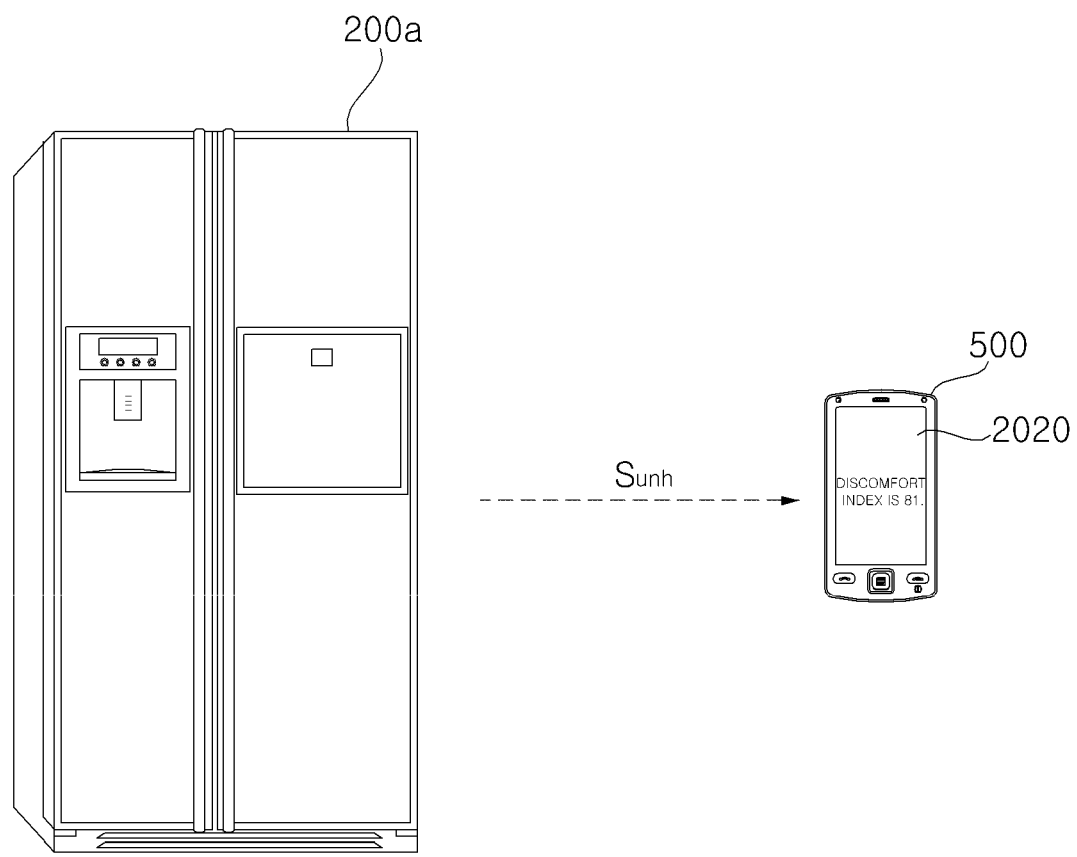

FIG. 16D illustrates the case in which the communication unit 222 of the fridge 200a transmits calculated discomfort index information Sfunh to the mobile terminal 500. The mobile terminal 500 may receive the calculated discomfort index information and then may immediately display the discomfort index information as shown in FIG. 16D. FIG. 16D illustrates the case in which an index image 2020 is displayed on the mobile terminal 500A.

The home appliance 200 may calculate an ultraviolet index based on region information and weather information of external environment data in addition to a food poisoning index and a discomfort index or calculate a car wash index and a laundry washing index based on current temperature information, humidity information, and weather information of the external environment data.

The home appliance and the operating method thereof according to the present invention are not limited to the configurations and methods of the above-described embodiments. That is, the above-described embodiments may be partially or wholly combined to make various modifications.

The operating method of the home appliance according to the present invention can also be embodied as codes readable by a processor included in the home appliance on a processor readable recording medium. The processor readable recording medium is any data storage device that can store data which can be thereafter read by a processor. Examples of the processor readable recording medium include read-only memory (ROM), random-access memory (RAM), magnetic tapes, floppy disks, optical data storage devices, carrier wave such as transmission via the Internet, etc. The processor readable recording medium can also be distributed over network coupled computer systems so that the processor readable code is stored and executed in a distributed fashion.

According to an embodiment of the present invention, a home appliance may receive audio data and information data from a mobile terminal and output the received audio data to an audio output unit. Thus audio data received from the mobile terminal may be simply output.

Information data may be displayed through a display and thus audio data output and information data display may be simultaneously performed.

According to another embodiment of the present invention, after being paired with a mobile terminal, a home appliance receives external environment data from the mobile terminal and calculates and outputs related information based on the received external environment data. Thus, related information based on the external environment data may be simply output from the mobile terminal.

The related information may be output through the audio output unit and the display and thus a user may simply recognize the related information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance comprising:
an audio output unit;
a communication unit to pair the home appliance with a mobile terminal and to receive audio data and information data from the mobile terminal after the pairing is completed; and
a controller to output the received audio data through the audio output unit,
wherein the pairing is completed after the communication unit receives a pairing request signal from the mobile terminal and transmits a pairing response signal to the mobile terminal,
wherein the pairing request signal includes information regarding a plurality of frequency bands and information regarding a target home appliance, and
wherein the pairing response signal includes information regarding a specific frequency band selected from the plurality of frequency bands.

2. The home appliance according to claim 1, wherein the information data comprises time information.

3. The home appliance according to claim 1, further comprising a display to display the received information data.

4. The home appliance according to claim 1, wherein the communication unit transmits state information of the home appliance to the mobile terminal.

5. The home appliance according to claim 1, further comprising an audio input unit to receive input voice data,
wherein the communication unit transmits the input voice data to the mobile terminal.

6. The home appliance according to claim 1, wherein the communication unit receives the audio data and the information data via a Bluetooth communication method.

7. The home appliance according to claim 1, wherein the communication unit and the audio output unit are included in a single module.

8. The home appliance according to claim 1, wherein:
the information data comprises external environment data; and
the controller calculates related information based on the received external environment data and outputs the calculated related information through the audio output unit.

9. The home appliance according to claim 8, wherein:
the external environment data comprises at least one of time information indicating current time, country information, region information, current temperature information, humidity information, and weather information; and
the calculated related information comprises at least one of a food poisoning index, a discomfort index, a car wash index, an ultraviolet index, and a laundry washing index.

10. An operating method of a home appliance, the operating method comprising:
pairing the home appliance with a mobile terminal;
receiving audio data and information data from the mobile terminal after the pairing is completed; and
outputting the received audio data through an audio output unit,
wherein the pairing includes receiving a pairing request signal from the mobile terminal and transmitting a pairing response signal to the mobile terminal,
wherein the pairing request signal includes information regarding a plurality of frequency bands and information regarding a target home appliance, and
wherein the pairing response signal includes information regarding a specific frequency band selected from the plurality of frequency bands.

11. The operating method according to claim 10, wherein the information data comprises time information.

12. The operating method according to claim 10, further comprising displaying the received information data.

13. The operating method according to claim 10, further comprising transmitting state information of the home appliance to the mobile terminal.

14. The operating method according to claim 10, further comprising transmitting voice data to the mobile terminal when the voice data is input through an audio input unit.

15. The operating method according to claim 10, wherein the audio data and the information data are received via a Bluetooth communication method.

* * * * *